United States Patent
Masuda et al.

(10) Patent No.: US 12,174,010 B2
(45) Date of Patent: Dec. 24, 2024

(54) IN-MOLD SOLIDIFIED SHELL THICKNESS ESTIMATION APPARATUS, IN-MOLD SOLIDIFIED SHELL THICKNESS ESTIMATION METHOD, AND CONTINUOUS STEEL CASTING METHOD

(71) Applicant: JFE STEEL CORPORATION, Tokyo (JP)

(72) Inventors: Ryosuke Masuda, Tokyo (JP); Yoshinari Hashimoto, Tokyo (JP); Akitoshi Matsui, Tokyo (JP); Shugo Morita, Tokyo (JP); Tatsuro Hayashida, Tokyo (JP); Taiga Koriyama, Tokyo (JP); Miho Sato, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 71 days.

(21) Appl. No.: 17/761,642

(22) PCT Filed: Sep. 4, 2020

(86) PCT No.: PCT/JP2020/033562
§ 371 (c)(1),
(2) Date: Mar. 18, 2022

(87) PCT Pub. No.: WO2021/065342
PCT Pub. Date: Apr. 8, 2021

(65) Prior Publication Data
US 2022/0333921 A1    Oct. 20, 2022

(30) Foreign Application Priority Data
Oct. 3, 2019    (JP) .................................. 2019-182825

(51) Int. Cl.
  G01B 21/08    (2006.01)
  B22D 11/16    (2006.01)
  B22D 11/22    (2006.01)

(52) U.S. Cl.
  CPC ............ G01B 21/085 (2013.01); B22D 11/16 (2013.01); B22D 11/225 (2013.01)

(58) Field of Classification Search
  CPC ..... B22D 11/16; B22D 11/188; B22D 11/207; B22D 11/225
  See application file for complete search history.

(56) References Cited

U.S. PATENT DOCUMENTS

| 10,286,447 B2 * | 5/2019 | Kosugi ................. B22D 11/22 |
| 2009/0266505 A1 | 10/2009 | Mizoguchi et al. |

(Continued)

FOREIGN PATENT DOCUMENTS

| CN | 102228969 A | 11/2011 |
| CN | 102228970 A | 11/2011 |

(Continued)

OTHER PUBLICATIONS

Machine Translation of Nakagawa et al (JP 2007-167871A, published Jul. 5, 2007, cited in IDS filed Mar. 18, 2022). (Year: 2007).*

(Continued)

*Primary Examiner* — Kevin E Yoon
*Assistant Examiner* — Jacky Yuen
(74) *Attorney, Agent, or Firm* — Oliff PLC

(57) ABSTRACT

An in-mold solidified shell thickness estimation apparatus includes: an input device; a model database configured to store a model formula and a parameter related to a solidification reaction of a molten steel inside a mold of a continuous casting facility; and a heat transfer model calculator configured to estimate an in-mold solidified shell thickness by calculating temperature distributions of the (Continued)

mold and of the molten steel inside the mold by solving a three-dimensional unsteady heat transfer equation. The heat transfer model calculator is configured to correct errors in a temperature of a mold copper plate and in an amount of heat removed from the mold, by correcting an overall heat transfer coefficient between the mold copper plate and the solidified shell.

18 Claims, 15 Drawing Sheets

(56) References Cited

U.S. PATENT DOCUMENTS

| | | | |
|---|---|---|---|
| 2015/0343530 A1 | 12/2015 | Duncan et al. | |
| 2016/0332221 A1 | 11/2016 | Kosugi et al. | |

FOREIGN PATENT DOCUMENTS

| | | |
|---|---|---|
| CN | 102228972 A | 11/2011 |
| CN | 104331629 A | 2/2015 |
| CN | 104540617 A | 4/2015 |
| CN | 106413942 A | 2/2017 |
| EP | 3 943 213 A1 | 1/2022 |
| JP | 2002-96147 A | 4/2002 |
| JP | 2007-167871 A | 7/2007 |
| JP | 2009-142876 A | 7/2009 |
| JP | 2011-079023 A | 4/2011 |
| JP | 2014-036998 A | 2/2014 |
| JP | 5953801 B2 | 7/2016 |
| JP | 2016-175114 A | 10/2016 |
| KR | 20140017144 A * | 2/2014 |
| RU | 2 163 178 C1 | 2/2001 |
| SU | 959908 A1 | 9/1982 |
| SU | 1496916 A1 | 7/1989 |
| TW | I319722 B | 1/2010 |
| WO | 2015/115651 A1 | 8/2015 |

OTHER PUBLICATIONS

Watanable, Shunroku et al. "Density of Pure Iron in Solid and Liquid States," Journal of the Japan Institute of Metals and Materials, vol. 45, No. 3, pp. 242-249, 1981.

Sep. 29, 2020 International Search Report issued in International Patent Application No. PCT/JP2020/033562.

Aug. 5, 2022 Extended Search Report issued in European Patent Application No. 20871941.9.

Mar. 7, 2023 Office Action issued in Chinese Patent Application No. 202080068598.1.

Nov. 18, 2022 Office Action issued in Russian Patent Application No. 2022108447.

May 19, 2022 Office Action issued in Taiwan Patent Application No. 109131676.

* cited by examiner

FIG.1
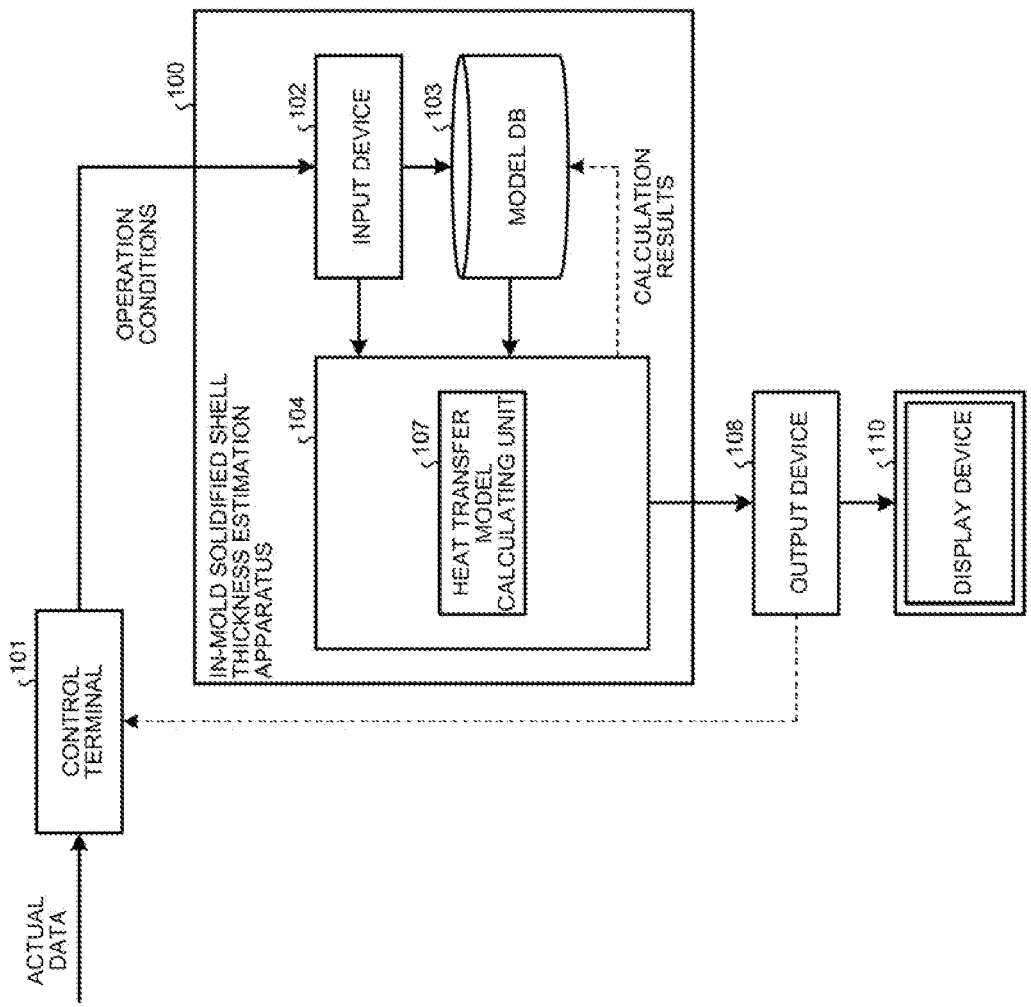
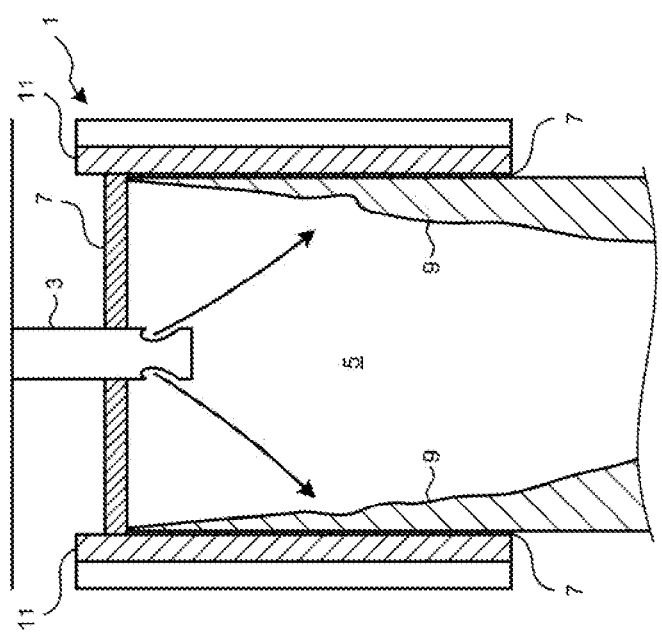

FIG.6
(a)
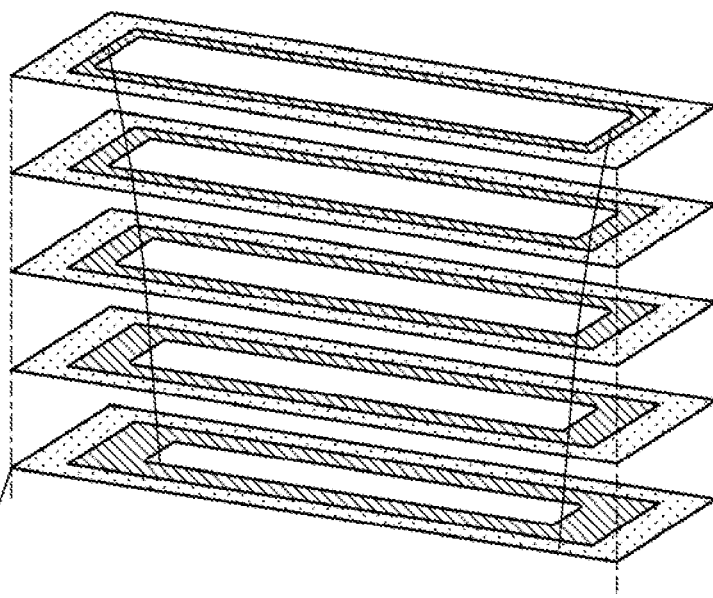
(b)
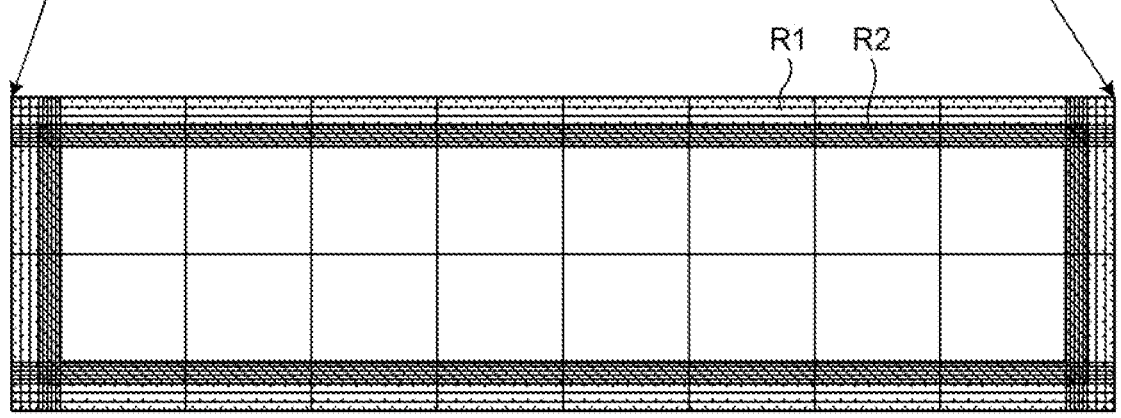

IN-MOLD SOLIDIFIED SHELL THICKNESS ESTIMATION APPARATUS, IN-MOLD SOLIDIFIED SHELL THICKNESS ESTIMATION METHOD, AND CONTINUOUS STEEL CASTING METHOD

FIELD

The present invention relates to an in-mold solidified shell thickness estimation apparatus, an in-mold solidified shell thickness estimation method, and a continuous steel casting method.

BACKGROUND

In a continuous caster, molten steel is continuously poured from a tundish, cooled inside a mold with embedded water-cooling pipes, and is withdrawn from the bottom of the mold. Although there has been an increased demand for improving the productivity of the continuous casting process with high-speed casting, an increased casting speed results in a reduced thickness of the solidified shell on a strand at the lower end of the mold, and nonuniformity in the solidified shell thickness distribution. As a result, what is called breakout, in which the solidified shell breaks and spills out, might occur when a part with a thin solidified shell arrives at the mold exit. If breakout occurs, a downtime becomes extended and productivity declines significantly. Therefore, there has been a demand for development of a technique enabling an accurate prediction of the possible breakout while high-speed casting is being carried out, and various techniques have been disclosed. For example, Patent Literature 1 describes a method for predicting the solidified shell thickness at the mold exit by estimating the solidified shell thickness at a predetermined position in a direction from the molten-metal surface to the mold exit, based on a heat flux profile of the molten steel within a range from the molten metal surface to the mold exit.

CITATION LIST

Patent Literature

Patent Literature 1: Japanese Patent Application Laid-open No. 2011-79023

Non Patent Literature

Non Patent Literature 1: Journal of the Japan Institute of Metals and Materials, Vol. 45 (1981), No. 3, p. 242

SUMMARY

Technical Problem

However, in the method disclosed in Patent Literature 1, the heat input to the solidification interface by the flow of molten steel inside the mold is considered only in a steady state. Therefore, with the method disclosed in Patent Literature 1, there is a possibility that the estimation of the solidified shell thickness often becomes offset due to an offset of the sensible heat resultant of an unsteady change in the molten steel flow. Furthermore, in the method disclosed in Patent Literature 1, there are two factors resulting in an offset in the calculation of the heat flux from its actual measurement: the effect of an air layer (air gap) between the mold copper plate and the solidified shell; and the effect of the molten steel flow. An increase in the heat flux can be attributed to the following two cases: a case in which the thermal resistance has dropped due to a reduction in the air gap; and a case in which the heat supply has increased due to a colliding flow of the molten steel. While a reduction in the air gap results in a decrease in the solidified shell thickness, an increase in the heat supply results in an increased solidified shell thickness. Therefore, in order to estimate the solidified shell thickness accurately, it is necessary to calibrate the amount of heat removed from the mold by considering the effect of the air gap and the effect of the molten steel flow separately. However, in the method disclosed in Patent Literature 1, because the solidified shell thickness is estimated without separating the effects of the air gap and the molten steel flow on the amount of heat removed from the mold, there is a possibility that an estimation of the solidified shell thickness becomes less accurate.

The present invention is made in consideration of the challenge described above, and an object of the present invention is to provide an in-mold solidified shell thickness estimation apparatus and an in-mold solidified shell thickness estimation method capable of estimating an in-mold solidified shell thickness accurately. Furthermore, another object of the present invention is to provide a continuous steel casting method capable of casting steel productively.

Solution to Problem

An in-mold solidified shell thickness estimation apparatus according to the present invention includes: an input device configured to receive an input of: a measurement result of a temperature of molten steel in a tundish of a continuous casting facility; measurement results of a width of a strand being cast and of a casting speed in the continuous casting facility; measurement results of a temperature of a mold copper plate and of an amount of heat removed from a mold in the continuous casting facility; and input values of a chemical composition of the molten steel and of the thickness of the strand; a model database configured to store a model formula and a parameter related to a solidification reaction of the molten steel inside the mold of the continuous casting facility; and a heat transfer model calculator configured to estimate an in-mold solidified shell thickness by calculating temperature distributions of the mold and of the molten steel inside the mold by solving a three-dimensional unsteady heat transfer equation using the measurement result of the temperature of the molten steel in the tundish of the continuous casting facility, the measurement results of the width of the strand being cast and of the casting speed in the continuous casting facility, the measurement results of the temperature of the mold copper plate and of the amount of heat removed from the mold in the continuous casting facility, and the input values of the chemical composition of the molten steel and of the thickness of the strand, and the model formula and the parameter, wherein the heat transfer model calculator is configured to correct errors in the temperature of the mold copper plate and in the amount of heat removed from the mold, by correcting an overall heat transfer coefficient between the mold copper plate and the solidified shell.

The heat transfer model calculator may be configured to correct the errors in the mold copper plate temperature and in the amount of heat removed from the mold, by correcting a thermal conductivity of a region having a temperature higher than a solidus temperature and lower than a liquidus temperature of the molten steel, in addition to correcting the overall heat transfer coefficient.

The heat transfer model calculator may be configured to calculate an amount of solidification shrinkage of the molten steel, from the temperature distribution of the molten steel inside the mold, and calculate the overall heat transfer coefficient between the mold and the solidified shell based on the amount of solidification shrinkage.

The input values of the chemical composition of the molten steel and the strand thickness may be measurement results of the chemical composition of the molten steel and the strand thickness.

An in-mold solidified shell thickness estimation method according to the present invention includes: an input step of inputting: a measurement result of a temperature of molten steel in a tundish of a continuous casting facility; measurement results of a width of a strand being cast and of a casting speed in the continuous casting facility; measurement results of a temperature of a mold copper plate and of an amount of heat removed from a mold in the continuous casting facility; and input values of a chemical composition of the molten steel and of the thickness of the strand; a heat transfer model calculating step of estimating an in-mold solidified shell thickness by calculating temperature distributions of the mold and of the molten steel inside the mold by solving a three-dimensional unsteady heat transfer equation using the measurement result of the temperature of the molten steel in the tundish of the continuous casting facility, the measurement results of the width of the strand being cast and of the casting speed in the continuous casting facility, the measurement results of the temperature of the mold copper plate and of the amount of heat removed from the mold in the continuous casting facility, and the input values of the chemical composition of the molten steel and of the thickness of the strand, and a model formula and a parameter related to a solidification reaction of the molten steel inside the mold of the continuous casting facility, wherein the heat transfer model calculating step includes a step of correcting errors in the mold copper plate temperature and in the amount of heat removed from the mold, by correcting an overall heat transfer coefficient between the mold copper plate and the solidified shell.

The heat transfer model calculating step may include a step of correcting the errors in the mold copper plate temperature and the amount of heat removed from the mold by correcting a thermal conductivity of a region having a temperature higher than a solidus temperature and lower than a liquidus temperature of the molten steel, in addition to correcting the overall heat transfer coefficient.

The heat transfer model calculating step includes a step of: calculating an amount of solidification shrinkage of the molten steel, from the temperature distribution of the molten steel inside the mold, and calculating an overall heat transfer coefficient between the mold and the solidified shell based on the amount of solidification shrinkage.

The input values of the chemical composition of the molten steel and the strand thickness may be measurement results of the chemical composition of the molten steel and the strand thickness.

A continuous steel casting method according to the present invention includes a control step of controlling an amount of secondary cooling water based on an in-mold solidified shell thickness estimated by the in-mold solidified shell thickness estimation method according to the present invention.

The control step may include a step of determining an abnormality of an in-mold solidified shell thickness by comparing a difference between a maximum value and a minimum value of in-mold solidified shell thicknesses inside the mold, the in-mold solidified shell thicknesses being those within a predetermined given range, with an average of the in-mold solidified shell thicknesses within the predetermined given range, and of controlling an amount of secondary cooling water, when it is determined that there is an abnormality in the in-mold solidified shell thickness, in such a manner that the in-mold solidified shell thickness becomes equal to or more than a thickness corresponding to a given ratio of the strand thickness, when a strand portion reaches a secondary cooling zone that is immediately below the mold.

Advantageous Effects of Invention

With the in-mold solidified shell thickness estimation apparatus and the in-mold solidified shell thickness estimation method according to the present invention, the in-mold solidified shell thickness can be estimated accurately. Furthermore, with the continuous steel casting method according to the present invention, steel can be cast productively.

BRIEF DESCRIPTION OF DRAWINGS

FIG. 1 is a schematic illustrating a configuration of an in-mold solidified shell thickness estimation apparatus that is one embodiment of the present invention.

FIG. 6 is a schematic illustrating an exemplary configuration of a three-dimensional unsteady heat transfer calculation model.

DESCRIPTION OF EMBODIMENTS

Figure 2:
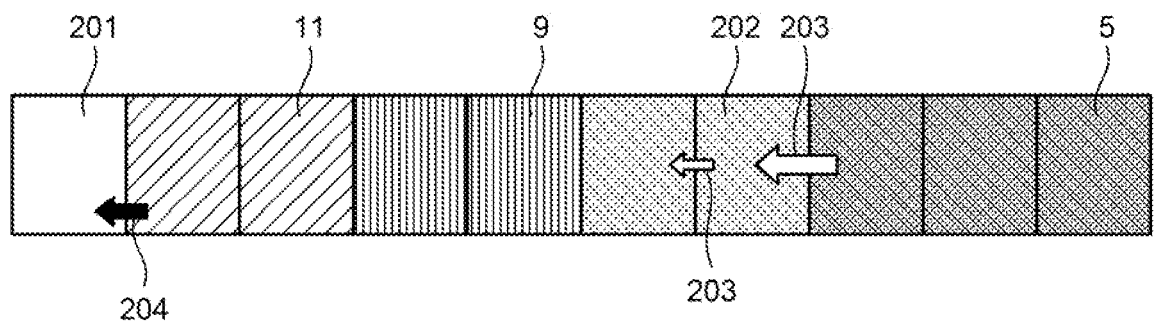
FIG. 2 is a schematic illustrating an exemplary configuration of a one-dimensional unsteady heat transfer calculation model.

A configuration of an in-mold solidified shell thickness estimation apparatus that is one embodiment of the present invention, and an operation thereof will now be explained in detail with reference to some drawings.

Configuration of In-Mold Solidified Shell Thickness Estimation Apparatus

To begin with, a configuration of the in-mold solidified shell thickness estimation apparatus that is one embodiment of the present invention will now be explained with reference to FIG. 1.

FIG. 1 is a schematic illustrating a configuration of the in-mold solidified shell thickness estimation apparatus that is one embodiment of the present invention. As illustrated in FIG. 1, the in-mold solidified shell thickness estimation apparatus 100 that is one embodiment of the present invention is an apparatus for estimating the thickness of a solidified shell 9 formed as the molten steel 5 solidifies inside a mold 1 (in-mold solidified shell thickness) included in a continuous casting facility, in a steel industry. A submerged depth of a submerged entry nozzle 3 of the continuous casting facility, a casting speed, an interval between mold copper plates 11, the interval corresponding to the width and the thickness of a strand to be cast by the continuous casting facility, a chemical composition and a temperature of the molten steel 5 in the tundish of the continuous casting facility, and actual measurement information (measurement results) of the temperature of the mold copper plates 11 and of the amount of heat removed from the mold are sent to a control terminal 101. The reference sign 7 in FIG. 1 represents mold powder. The actual measurement information of the amount of heat removed from the mold is calculated using the flow rate of the cooling water supplied to the mold 1, and the cooling water temperatures on an entry side and an exit side of the mold 1, for example. Furthermore, in this embodiment, various measurements (actual measurements) are used as inputs to a heat transfer calculation model, which is to be described later, but it also possible to use predetermined settings for the chemical composition of the molten steel and the strand thickness.

A control system to which the in-mold solidified shell thickness estimation apparatus 100 and the in-mold solidified shell thickness estimation method are applied is provided with a control terminal 101, the in-mold solidified shell thickness estimation apparatus 100, an output device 108, and a display device 110, as main elements. The control terminal 101 is configured as an information processing apparatus such as a personal computer or a workstation, and collects various types of actual measurement information, a distribution of the in-mold solidified shell thickness, temperatures of the mold copper plates 11, and an estimation of the amount of heat removed from the mold.

The in-mold solidified shell thickness estimation apparatus 100 is configured as an information processing apparatus such as a personal computer or a workstation. The in-mold solidified shell thickness estimation apparatus 100 is provided with an input device 102, a model database (model DB) 103, and an arithmetic processing unit 104.

The input device 102 is an input interface with which various types of actual measurement information related to the continuous casting facility are input. Examples of the input device 102 includes a keyboard, a mouse, a pointing device, a data receiver device, and a graphical user interface (GUI). The input device 102 receives actual measurement information, parameter settings, and the like from the external, writes the information to the model DB 103, and transmits the information to the arithmetic processing unit 104. To the input device 102, the actual measurement information is input from the control terminal 101. The actual measurement information includes, for example, a submerged depth of the submerged entry nozzle 3, a casting speed, an interval between mold copper plates 11 corresponding to the width and the thickness of a strand to be cast, chemical composition information and temperature information of molten steel 5, temperatures of the mold copper plates 11, and the amount of heat removed from the mold information.

The model DB 103 is a storage device storing therein information of a model formula related to a solidification reaction of the molten steel 5 in the continuous casting facility. As the information of a model formula related to the solidification reaction of the molten steel 5, the model DB 103 stores therein parameters of the model formula. Furthermore, the model DB 103 stores therein various types of information input to the input device 102, and calculation results calculated by the arithmetic processing unit 104 based on the actual operations.

The arithmetic processing unit 104 is provided as an arithmetic processing unit such as a central processing unit (CPU), and controls the entire operation of the in-mold solidified shell thickness estimation apparatus 100. The arithmetic processing unit 104 has a function as a heat transfer model calculating unit 107. The heat transfer model calculating unit 107 is implemented by, for example, causing the arithmetic processing unit 104 to execute a computer program. The arithmetic processing unit 104 functions as the heat transfer model calculating unit 107 by executing a computer program for the heat transfer model calculating unit 107. The arithmetic processing unit 104 may also include a dedicated arithmetic processor or an arithmetic processing circuit functioning as the heat transfer model calculating unit 107.

The heat transfer model calculating unit 107 estimates a distribution of the temperature of the mold copper plates 11 and a distribution of the temperature inside the mold 1, an amount of heat removed from the mold, and a distribution of the in-mold solidified shell thickness, by solving a three-dimensional unsteady heat conduction equation based on the actual operation information, and the model information stored in the model DB 103.

The output device 108 outputs various types of process information of the in-mold solidified shell thickness estimation apparatus 100 to the control terminal 101 and to the display device 110. The display device 110 outputs to display the various types of process information of the in-mold solidified shell thickness estimation apparatus 100, output from the output device 108.

The in-mold solidified shell thickness estimation apparatus 100 having such a configuration estimates a distribution of the solidified shell thickness inside the mold 1, by executing the in-mold solidified shell thickness estimation process to be described below.

Conversion between Flow Rate of Molten Steel and Thermal Conductivity of Semi-Solidified Region In order to obtain an accurate estimation of a temporal change in a three-dimensional distribution of the in-mold solidified shell thickness, it is important to consider a temporal change in the local heat flux, resultant of an unsteady change in the molten steel flow. In order to give a consideration to this factor, it is necessary to acquire a coupled solution to a three-dimensional unsteady flow calculation related to the molten steel flow, and a three-dimensional unsteady heat transfer calculation related to the solidification of the molten steel 5. However, such a coupled calculation exhibits a poor converging property, disadvantageously, so that the computation time becomes extended. Therefore, in the present invention, an in-mold solidified shell thickness distribution is calculated with a three-dimensional unsteady heat transfer model alone, by using a thermal conductivity of a semi-solidified region, to compensate for a change in the temperature of the mold copper plates 11 and a change in the amount of heat removed from the mold, such changes being resultant of a change in the molten steel flow. The semi-solidified region is a region going through a solidification, and extending between the liquid phase and the solidified shell 9 of the molten steel 5. Due to the presence of the semi-solidified region, the interface between solidified shell 9 and the molten steel 5 cannot be defined precisely in a physical calculation model. Therefore, with a physical calculation model, it is difficult to handle a heat transfer on the interface between the molten steel 5 and the solidified shell 9, directly. To address this issue, the present invention is configured to make a flow rate of the molten steel dependent on the thermal conductivity of the semi-solidified region, instead of on the heat transfer coefficient of the solidification interface.

A relation between the flow rate of the molten steel and the thermal conductivity of the semi-solidified region will now be explained. Although it is difficult to carry out a coupled calculation of a three-dimensional unsteady flow calculation related to the molten steel flow and a three-dimensional unsteady heat transfer calculation related to the solidification of the molten steel 5, a one-dimensional unsteady flow calculation and a one-dimensional unsteady heat transfer calculation exhibit good convergence. Therefore, for the present invention, a one-dimensional unsteady heat transfer calculation model including a convective term was created, as indicated in the schematic in FIG. 2. As illustrated in FIG. 2, in this embodiment, for simplicity, calculation cells on both ends of the model were considered as cooling water 201 for the mold copper plate 11 and the molten steel 5, respectively, with an assumption that temperatures of the cooling water and the molten steel are constant. Furthermore, the calculation cells having lattice point temperatures within a range between a solidus temperature $T_S$ and a liquidus temperature $T_L$ were established as a semi-solidified region 202, and a phenomenon in which a colliding flow (discharge flow) becomes diffused sideways along the solidified shell surface was modelled by decreasing the flow rate of the molten steel, in accordance with an increase in the ratio of the solid phase in the semi-solidified region 202. The reference signs 203 and 204 in FIG. 2 indicate the flow rate of the molten steel and the amount of heat removed from the mold, respectively. The temperatures of the calculation cells were then calculated by discretizing a one-dimensional unsteady heat conduction equation including a convective term, indicated as Equation (1) below.

$$\rho \frac{\partial (C_P T)}{\partial t} = \frac{\partial}{\partial x}\left(k \frac{\partial T}{\partial x}\right) - \rho \frac{\partial (C_P u T)}{\partial x} \quad (1)$$

In Equation (1), $\rho$ [kg/m³] denotes a density; $C_P$ [J/(kg·K)] denotes a specific heat capacity; k [W/(m·K)] denotes a thermal conductivity; T [K] denotes a temperature; and u [m/s] denotes a flow rate of the molten steel.

Figure 3:
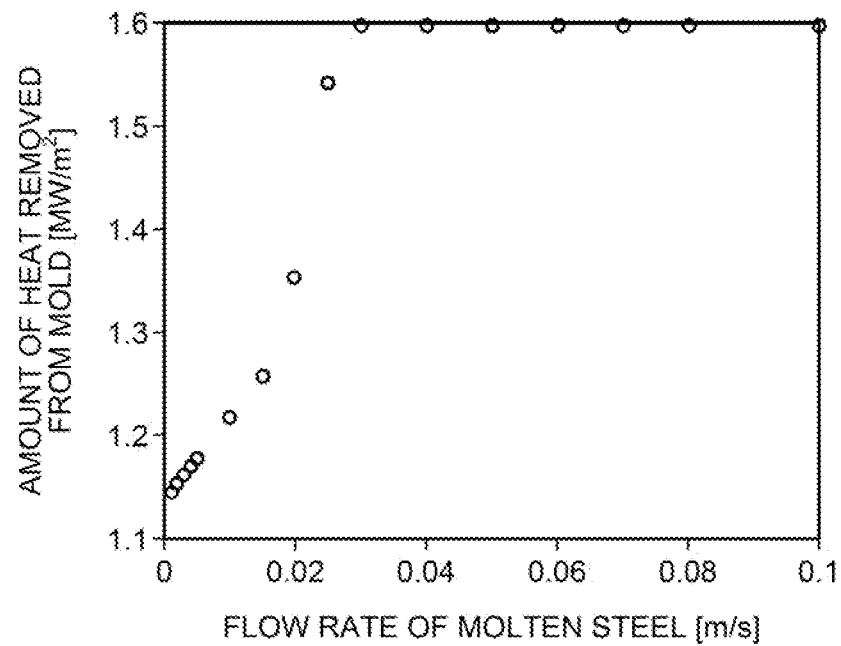
FIG. 3 is a schematic illustrating one example of a relation between a flow rate of molten steel and the amount of heat removed from the mold.

The temperatures of the calculation cells were then calculated until the steady state was reached under the condition indicated in Table 1, and the heat flux from the calculation cell of the solidified shell 9 to the calculation cell of the mold copper plate 11 was calculated, as the amount of heat removed from the mold. FIG. 3 illustrates a relation between the flow rate of the molten steel and the calculation of the amount of heat removed from the mold. As illustrated in FIG. 3, when the flow rate of the molten steel increased, the calculation of the amount of heat removed from the mold also increased monotonically. However, when the flow rate of the molten steel exceeded 0.03 [m/s], the amount of heat removed from the mold saturated. This is considered to be because the solidified shell 9 was not formed due to the effect of the molten steel flow.

TABLE 1

| | | |
|---|---|---|
| Copper Density $C_{P,Cu}$ | 600 | J/(kg · K) |
| Thermal Conductivity of Copper $k_{Cu}$ | 300 | W/(m · K) |
| Thermal Conductivity of Molten Steel $k_{Fe}$ | 30 | W/(m · K) |
| Molten Steel Density $\rho_{Fe}$ | 7000 | kg/m³ |
| Powder Thickness | 0.0006 | m |
| Mold Copper Plate Thickness | 0.03 | m |
| Thermal Conductivity of Powder | 1.5 | W/(m · K) |
| Molten Steel Pouring Temperature | 1530 | ° C. |
| Liquidus Temperature $T_L$ | 1530 | ° C. |
| Solidus Temperature $T_S$ | 1500 | ° C. |
| Heat Transfer Coefficient of Cooling Water | 25000 | W/(m² · K) |
| Heat Transfer Coefficient of Air | 2500 | W/(m² · K) |

Figure 4:
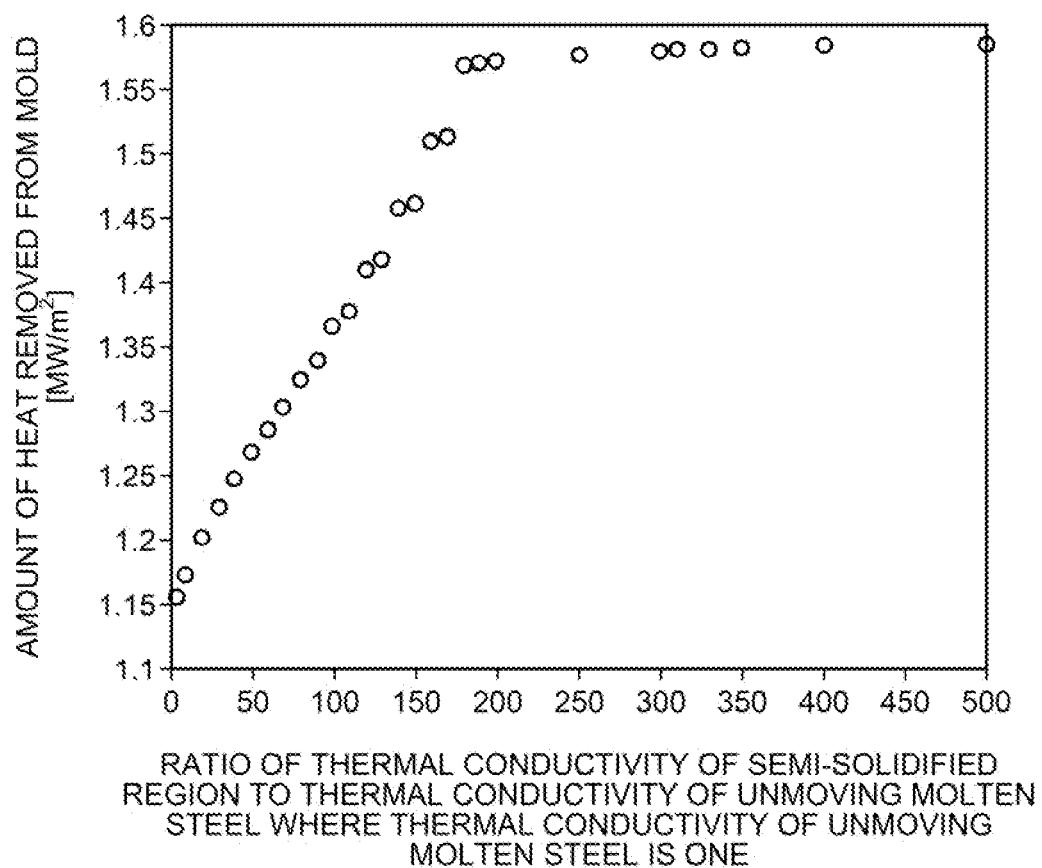
FIG. 4 is a schematic illustrating one example of a relation between a thermal conductivity of a semi-solidified region, and the amount of heat removed from the mold.

In the conditions indicated in Table 1, the thermal conductivity of the semi-solidified region was then changed, while keeping the flow rate of the molten steel at 0 [m/s]. FIG. 4 indicates a relation of a calculation of the amount of heat removed from the mold with respect to a ratio of the thermal conductivity of the semi-solidified region to the thermal conductivity of unmoving molten steel where the thermal conductivity of the unmoving molten steel is one. As illustrated in FIG. 4, when the thermal conductivity of the semi-solidified region becomes higher, the sensible heat supplied to the semi-solidified region increases, and therefore, the calculated amount of heat removed from the mold becomes greater. Based on the above, it became clear that a change in the amount of heat removed from the mold, resultant of a change in the molten steel flow, can be explained by a change in the thermal conductivity of the semi-solidified region.

In-Mold Solidified Shell Thickness Estimation Process

Figure 5:
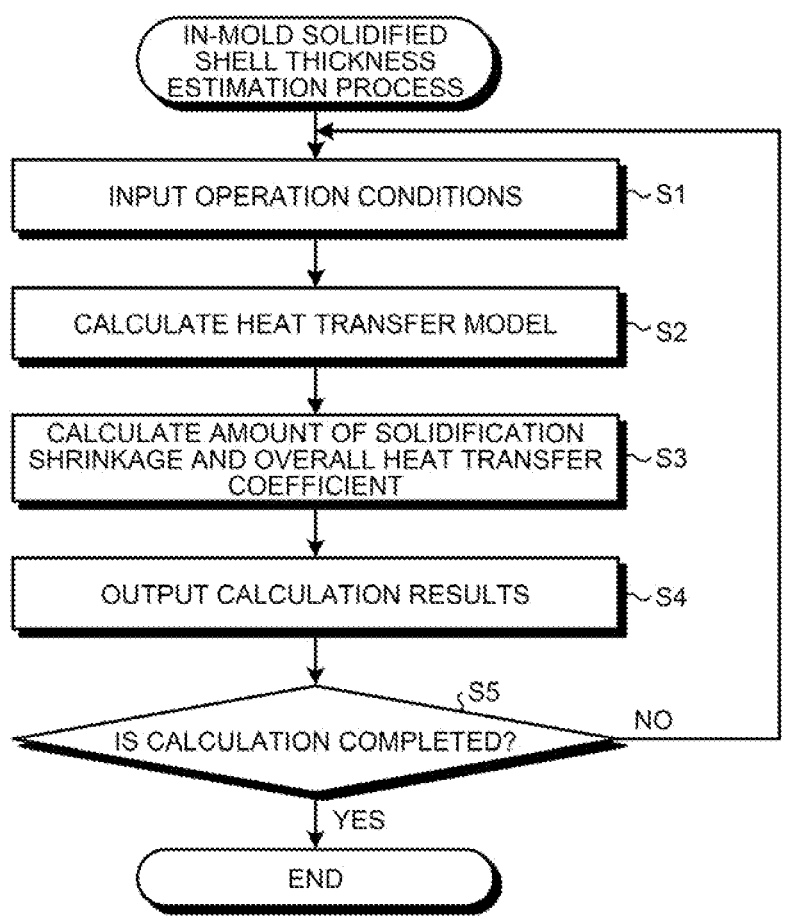
FIG. 5 is a flowchart illustrating the sequence of an in-mold solidified shell thickness estimation process that is one embodiment of the present invention.

FIG. 5 is a flowchart illustrating the sequence of an in-mold solidified shell thickness estimation process that is one embodiment of the present invention. The flowchart illustrated in FIG. 5 starts at the timing when pouring of the molten steel is started, and the in-mold solidified shell thickness estimation process goes to the process at Step S1.

In the process at Step S1, the arithmetic processing unit 104 acquires measurements and analytical values related to the molten steel 5 and the mold 1 from the control terminal 101. In the ordinary continuous casting operation, the actual measurement information of the casting speed and the interval between mold copper plates 11, corresponding to the width and the thickness of a strand to be cast, are collected at a constant frequency. In this embodiment, for simplicity, it is assumed that the actual measurement information related to the mold 1 is collected at a frequency of one second. It is also assumed that the actual measurement information related to the chemical composition and the temperature of the molten steel 5 is collected in the tundish at a regular or an irregular frequency. In this manner, the process at Step S1 is ended, and the in-mold solidified shell thickness estimation process goes to the process at Step S2.

In the process at Step S2, the heat transfer model calculating unit 107 executes a three-dimensional unsteady heat transfer calculation using the information obtained from the process at Step S1 and the information in the model DB 103. FIG. 6 illustrates one example of a built three-dimensional unsteady heat transfer calculation model. The region R1 illustrated in FIG. 6 represents a region corresponding to the mold copper plates 11, and a region on the inner side of this region represents a region corresponding to the molten steel 5 or the solidified shell 9. In this embodiment, the mold 1 was divided at an equal interval dz=50 [mm] in the height direction. In the width and thickness directions, the mold 1 was divided at an interval of 2 mm only in the region R2 where the solidified shell 9 was expected to grow, and the central part of the molten steel 5 is divided in such a manner that the calculation cell interval can be varied depending on the strand width and the strand thickness, while keeping the grid count fixed. In the heat transfer phenomenon in the height direction of the mold 1, the Péclet number Pe is in the order of $10^4$, the Péclet number being calculable with following Equation (2).

$$Pe = \frac{\rho u C_P}{\frac{k}{L}} \quad (2)$$

In Equation (2), L [m] denotes the height of the mold 1. The Péclet number Pe is a dimensionless number representing a ratio of convection to diffusion in the movement of heat, and as the Péclet number Pe is greater, it means that the convection has a greater effect on the movement of heat. In other words, the convective term contributes more significantly than the thermal conduction. Therefore, in the height direction of the mold 1, it was assumed that the molten steel 5 moves down at the casting speed, without taking the thermal conduction into consideration. With this assumption, a phenomenon represented by a three-dimensional unsteady heat transfer calculation model can be reproduced by arranging two-dimensional unsteady heat transfer calculation models in the height direction. The temperatures at the calculation cells in the width and the thickness directions of the mold 1 were then obtained by discretizing the two-dimensional unsteady heat transfer equation indicated below in Equation (3).

$$\rho \frac{\partial (C_P T)}{\partial t} = \frac{\partial}{\partial x}\left(k \frac{\partial T}{\partial x}\right) + \frac{\partial}{\partial y}\left(k \frac{\partial T}{\partial y}\right) \quad (3)$$

It was also assumed that the cooling water temperature $T_{water}$, remains constant, and the boundary condition of the interface between the mold copper plate 11 and the cooling water was set in accordance with the Newton's law of cooling indicated in Equation (4) below, using a heat transfer coefficient $h_{water}$ of the water.

$$-k\left(\frac{\partial T}{\partial x}\right) = h_{water}(T - T_{water}) \quad (4)$$

Figure 7:
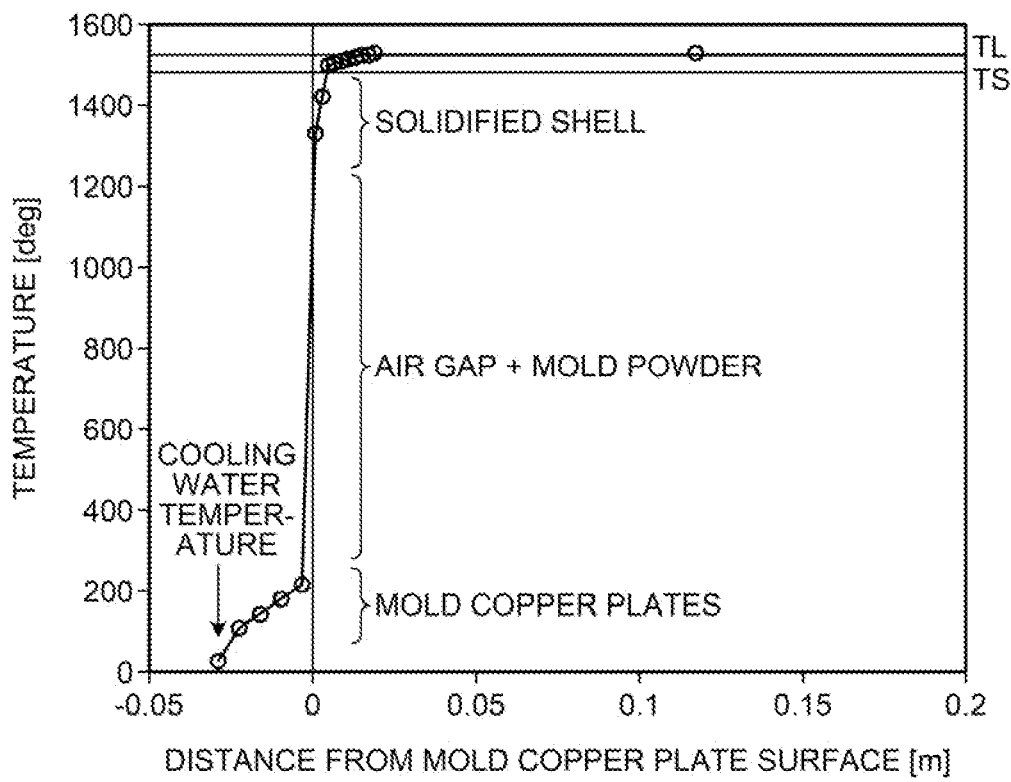
FIG. 7 is a schematic illustrating one example of a relation between a distance from the mold copper plate surface and the temperature.

FIG. 7 illustrates a relation between the temperature obtained by calculating the two-dimensional unsteady heat transfer equation indicated in Equation (3) until the steady state was reached, and a distance from the surface of the mold copper plate 11. The liquidus temperature $T_L$ and the solidus temperature $T_S$ were obtained from a regression equation of a steel type chemical composition and a temperature used in the actual operation. In the molten steel part, the solidified shell thickness was then obtained by considering the calculation cells with temperatures lower than the solidus temperature as the solidified shell 9. Furthermore, because the molten steel part having a temperature higher than the liquidus temperature $T_L$ is being stirred sufficiently, a uniform temperature was set to the calculation cells of this part, at each time step. As a result, the process at Step S2 is ended, and the in-mold solidified shell thickness estimation process goes to the process at Step S3.

Figure 8:
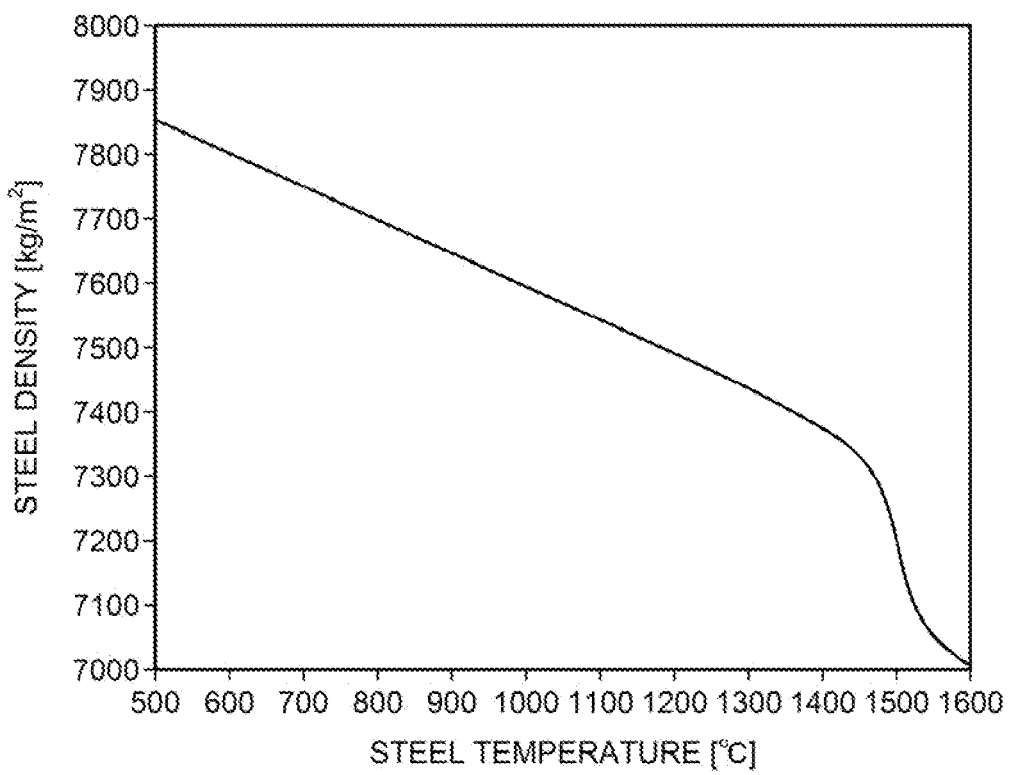
FIG. 8 is a schematic illustrating one example of a relation between the steel temperature and the steel density.

In the process at Step S3, the heat transfer model calculating unit 107 calculates the amount of solidification shrinkage and an overall heat transfer coefficient between the mold 1 and the solidified shell 9, using the information obtained from the process at Step S1 and Step S2 and the information in the model DB 103. The mold 1 is tapered in a direction from the top'to the bottom, taking the solidification shrinkage into consideration. In the upper part of the mold 1, because the amount of solidification shrinkage is greater than the tapering, the thickness of the air referred to as an air gap that is present between the solidified shell 9 and the mold copper plate 11 is large. By contrast, in the lower part of the mold 1, because the growing speed of the solidified shell gradually slows down and the amount of solidification shrinkage becomes smaller than the tapering, the air gap thickness sometimes becomes reduced. Because the air gap has a high thermal resistance, and contributes much to the amount of heat removed from the mold and to the solidified shell thickness, it is important to reproduce the amount of solidification shrinkage in the model. Therefore, the amount of solidification shrinkage was calculated. To begin with, temperature dependency of the steel density was set as illustrated in FIG. 8 (see non-Patent Literature 1), as an example, and the shrinkage rate $r_{shrink}$ of the solidified shell was defined as Equation (5).

$$r_{shrink} = \left(\frac{\rho_1}{\rho_0}\right)^{-\frac{1}{3}} \quad (5)$$

In Equation (5), $\rho_n$ denotes the molten steel density corresponding to the molten steel temperature immediately after the molten steel is discharged, and $\rho_1$ denotes the molten steel density corresponding to an outer surface temperature of the solidified shell. The amount of solidification shrinkage can be calculated by subtracting a strand width from a sum of multiplications of shrinkage rates by the widths dx of the respective calculation cells in the heat transfer model, the sum being calculated in the width direction, and the shrinkage rates being obtained from the respective calculation cells. The air gap $d_{air}$ at each height position was then derived, using Equation (7) indicated below, by subtracting the taper $d_{taper}$ obtained from the amount of solidification shrinkage with Equation (6).

$$d_{taper} = \frac{C_1 w \Delta h}{100} \quad (6)$$

$$d_{air} = \left( w - \sum (r_{shrink} \times dx) \right) - d_{taper} \quad (7)$$

In Equations (5) and (6), $C_1$ [%/m] denotes a tapering ratio; w [m] denotes the strand width; and $\Delta h$ [m] denotes the distance from the meniscus in the height direction. There is also a layer of mold powder 7 on the interface between the mold copper plate 11 and the solidified shell 9, in addition to the air gap, so the overall heat transfer coefficient $h_{all}$ between the mold and the solidified shell, taking the amount of the solidification shrinkage into consideration, was derived from Equation (8) indicated below.

$$h_{all} = A \exp(d_{air}/d_0) + B \quad (8)$$

It is preferable for the parameters A, B, and $d_0$ in Equation (8) to be adjusted based on the actual data in advance, before inputting these parameters to the model DB 103. In this manner, the process at Step S3 is ended, and the in-mold solidified shell thickness estimation process goes to the process at Step S4.

In the process at Step S4, the arithmetic processing unit 104 stores the calculation results in the model DB 103 and the output device 108. In this manner, the process at Step S4 is ended, and the in-mold solidified shell thickness estimation process goes to the process at Step S5.

In the process at Step S5, the arithmetic processing unit 104 determines whether the pouring has been ended. As a result of the determination, if the pouring has been ended (Yes at Step S5), the arithmetic processing unit 104 ends the sequence of the in-mold solidified shell thickness estimation process. If the casting has not been ended (No at Step S5), the arithmetic processing unit 104 updates the time step, and returns the in-mold solidified shell thickness estimation process to the process at Step S1.

Process for Correcting Unknown Disturbance

With the in-mold solidified shell thickness estimation process described above, it is not possible to take into consideration every and each unknown disturbance that is present in the actual continuous casting facility. Therefore, calculations of the mold copper plate temperature and the amount of heat removed from the mold may become deviated from the actual measurements, and the estimation accuracy of the thickness distribution of the solidified shell 9 may become deteriorated. Therefore, to improve the estimation accuracy of the thickness distribution of the solidified shell 9, a consideration is given to feeding back the errors in the temperature of the mold copper plate and the amount of heat removed from the mold, the errors being caused by the unknown disturbance, to the calculation of the heat transfer model.

To begin with, in order to minimize the number of variables to be used in explaining the temperature errors at multiple points, the temperature errors being those to be used in calibration, a feature quantity was extracted by running a principal component analysis. Because it can be presumed that the temperatures of the mold copper plates exhibit globally similar behaviors according to a change in the molten steel flow, it is assumed herein that the effect of the molten steel flow, among those of the disturbances, can be explained using the principal component of the temperature. Furthermore, in the heat transfer model calculation according to the embodiment, because a change in the molten steel flow is converted into thermal conductivity of the semi-solidified region, a parameter for correcting the thermal conductivity of the semi-solidified region (hereinafter, thermal conductivity parameter) was determined in such a manner that error in the mold copper plate temperature was reduced.

By contrast, a change in the air gap takes place locally in a part inside of the mold. Therefore, under an assumption that a change in the air gap takes place uniformly in the height direction of the mold, in the same manner as longitudinal cracking on the strand surface, and the overall heat transfer coefficient between the mold copper plate and the solidified shell was changed at each position in the width direction of the mold. Specifically, when the overall heat transfer coefficient becomes larger, the thermal resistance becomes smaller, and the amount of heat removed from the mold becomes increased. Therefore, the corrected amount of the overall heat transfer coefficient was determined so as to bring the calculation of the amount of heat removed from the mold closer to the actual measurement, at each position in the width direction of the mold. If the amount of heat removed from the mold can be calibrated at each position in the width direction of the mold, the total amount of heat removed from the mold will also match.

Method of Correcting Thermal Conductivity Parameter

The difference between an actual measurement and a calculation of the mold copper plate temperature includes some offset in their average: it was assumed herein that this offset is resultant of the overall deviation in the air gap. Therefore, for each of the actual measurements and the calculations of the mold copper plate temperature, a deviation of the temperatures at certain measurement points at the same height position of the mold, the deviation being that from the average, was calculated at each time, and a difference between the deviation in the actual measurement and the deviation in the calculation was then obtained. This difference is denoted as $\Delta T_i$ (i=1 to N). By applying a principal component analysis, the long axis of an ellipse is extracted as a principal component. When $\Delta T_{i,PCA}$ denotes a temperature error that can be explained with the principal component at each measurement point, and $\Delta T_{i,Noise}$ denotes a temperature error resultant of noise that cannot be explained with the principal component, a relation indicated in Equation (9) below is then established. Therefore, the temperature error $\Delta T_{i,PCA}$ is compensated by adjusting the thermal conductivity parameter of the semi-solidified region, and the temperature error $\Delta T_{i,Noise}$ is compensated by adjusting the overall heat transfer coefficient.

$$\Delta T_i = \Delta T_{i,PCA} + \Delta T_{i,Noise} \quad (9)$$

Figure 9:
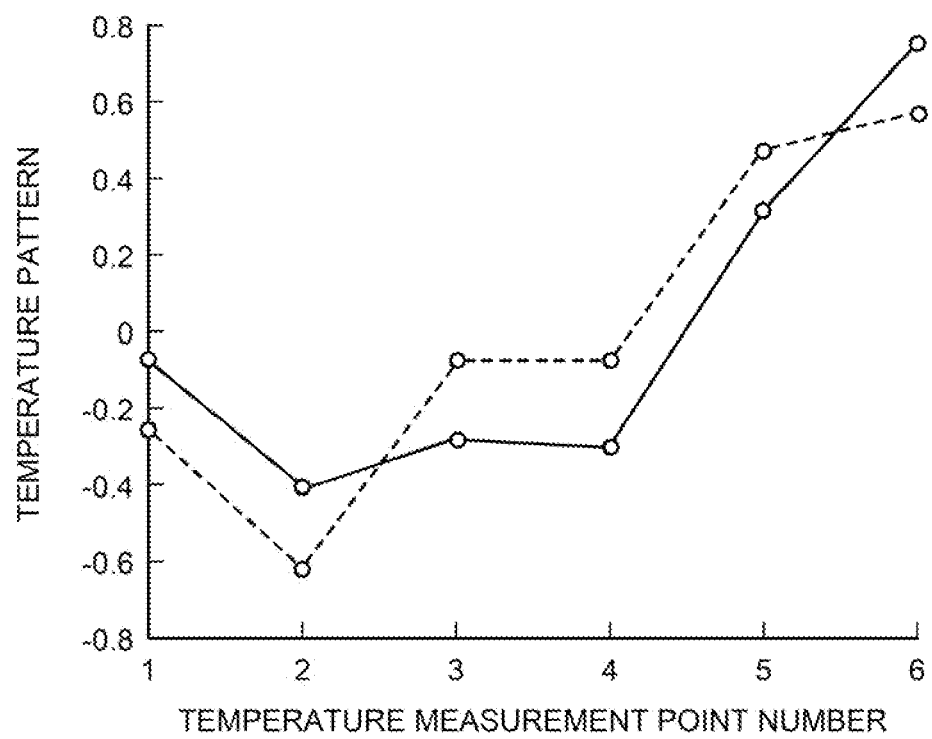
FIG. 9 is a schematic illustrating a relation between a temperature pattern at each position in the width direction of the mold, and a principal component.

To reproduce the explainable part of the temperature change taking place in the actual continuous casting facility, being explainable using a principal component, a temperature pattern having a shape similar to that of the principal component was created by performing a heat transfer model calculation. Specifically, a heat transfer model calculation is carried out until the steady state is reached in both of these cases, while changing the thermal conductivity parameter infinitesimally at each position in the width direction of the mold, under a certain input condition, and a difference between the temperatures before and after the parameter change is then calculated. The temperature pattern corresponding to the infinitesimal change $\Delta\alpha_i$ in the thermal conductivity of the semi-solidified region, at each position in the width direction of the mold, is denoted as $\Delta T_{i,pattern}$. A relation between the temperature pattern $\Delta T_{i,pattern}$ at each position in the width direction of the mold, and the obtained principal component is illustrated in FIG. 9. In FIG. 9, the dotted line represents the temperature pattern $\Delta T_{i,pattern}$, and the solid line represents the principal component. In the example illustrated in FIG. 9, a correlation coefficient between the temperature pattern $\Delta T_{i,pattern}$ and the principal component is 0.88, and therefore, it can be considered that the shape of the principal component has been successfully reproduced.

The thermal conductivity parameter was then determined, and the thermal conductivity in the heat transfer model calculation was then corrected by fitting the error in the mold copper plate temperature with the temperature pattern. Specifically, the thermal conductivity parameter a is obtained with the multiple linear regression analysis indicated in Equation (11) below in such a manner that the relation indicated in Equation (10) below is approximately established between the difference $\Delta T_i$ and the temperature pattern $\Delta T_{i,pattern}$.

$$\begin{pmatrix} \Delta T_1 \\ \Delta T_2 \\ \vdots \\ \Delta T_N \end{pmatrix} = a \begin{pmatrix} \Delta T_{1,pattern} \\ \Delta T_{2,pattern} \\ \vdots \\ \Delta T_{N,pattern} \end{pmatrix} \quad (10)$$

$$a = \left(\Delta T_{pattern}^T \Delta T_{pattern}\right)^{-1} \Delta T_{pattern}^T \Delta T \quad (11)$$

The thermal conductivity $\alpha_i$ (t) at time t was then corrected with Equation (12) indicated below, using the calculated thermal conductivity parameter a and the infinitesimal change $\Delta\alpha_i$ in the thermal conductivity.

$$\alpha_i(t+1) = \alpha_i(t) + a\Delta\alpha_i \quad (12)$$

Method of Correcting Overall Heat Transfer Coefficient

A heat transfer model calculation was carried out until the steady state was reached, while changing the overall heat transfer coefficient infinitesimally, at each position in the width direction of the mold, under the same input condition as that used in the previous section. A difference between the amounts of heat removed from the mold before and after the change in the overall heat transfer coefficient was then calculated. The amount of change in the overall heat transfer coefficient is denoted as $\Delta\beta$, and the amount of change in the amount of heat removed from the mold is denoted as $\Delta Q$. A coefficient $b_i$ was then obtained in such a manner that the relation indicated in Equation (13) was established between an error $\Delta HL_i$ in the amount of heat removed from the mold, and the amount of change $\Delta\beta$ in the overall heat transfer coefficient and the amount of change $\Delta Q$ in the amount of heat removed from the mold, at each position in the width direction of the mold. Using the obtained coefficient $b_i$ and the amount of change $\Delta\beta$ in the overall heat transfer coefficient, the overall heat transfer coefficient $\beta_i(t)$ at the time t was corrected as indicated in Equation (14) below. By following the steps described above, (i+1) different unknown values a, $b_1$, $b_2$, ..., $b_i$ were derived successfully.

$$\Delta HL_i = \frac{\Delta Q}{\Delta\beta} \cdot b_i \quad (13)$$

$$\beta_i(t+1) = \beta_i(t) + b_i\Delta\beta \quad (14)$$

Control of Amount of Secondary Cooling Water

Taking an average thickness dave, and a difference $\Delta d$ between the maximum value dmax and the minimum value dmin ($\Delta d$=dmax−dmin) of the in-mold solidified shell thicknesses d, when the ratio $\Delta d$/dave is high, the variability of the in-mold solidified shell thickness d is relatively high, and there are some regions where the in-mold solidified shell thickness d is smaller than the average dave. The inventors of the present invention found out that the risk of breakout increases rapidly when the ratio $\Delta d$/dave is equal to or more than 0.1, at a position 1 where the in-mold solidified shell thickness d is estimated in the casting direction, the position 1 being a position satisfying a condition 1/L≥0.2 with respect to the total length L of the mold in the casting direction. Therefore, when the ratio $\Delta d$/dave is equal to or more than 0.1, the amount of secondary cooling water is controlled so as to eliminate the part where the in-mold solidified shell thickness d is thin, at a timing at which such a region reaches the secondary cooling zone that is immediately below the mold, across a range in which a ratio d/D is equal to or less than 0.25, the ratio d/D being a ratio of the in-mold solidified shell thickness d with respect to the strand thickness D immediately below the mold. In this manner, the risk of breakout, that is, the ratio $\Delta d$/dave can be reduced. As a control target, it is preferable to control the concentration of the spray water in the secondary cooling zone until the ratio $\Delta d$/dave drops to a level equal to or less than 0.2, assuming that the in-mold solidified shell thickness d grows inside the mold after the estimation is made. It is favorable for the difference $\Delta d$ and the average dave to be calculated and evaluated for each side of the mold (the front and the rear sides of the wide faces, and each side of the narrow faces). Furthermore, the reference values of the ratio d/D and the ratio $\Delta d$/dave indicated herein are merely some examples, and are to be determined depending on the casting conditions such as the mold size, the casting width, and the casting speed of the continuous caster.

As is clear from the explanation above, the in-mold solidified shell thickness estimation apparatus 100 that is one embodiment of the present invention includes: the heat transfer model calculating unit 107 that estimates an in-mold solidified shell thickness by calculating distributions of the temperatures of the mold 1 and of the molten steel inside the mold 1, by solving a three-dimensional unsteady heat transfer equation using: measurement results of a temperature and a chemical composition of the molten steel 5 in the tundish of the continuous casting facility; measurement results of a width and a thickness of a strand being cast and of the casting speed in the continuous casting facility; measurement results of a temperature of the mold copper plate and an amount of heat removed from the mold in the continuous casting facility; and a model formula and a parameter related to a solidification reaction of the molten steel 5 inside the mold 1 of the continuous casting facility. The heat transfer model calculating unit 107 then corrects the errors in the temperature of the mold copper plate and the amount of heat removed from the mold, by correcting the thermal conductivity and the overall heat transfer coefficient between the mold copper plate 11 and the solidified shell, across a region where the temperature is higher than the solidus temperature and lower than the liquidus temperature of the molten steel 5. In this manner, the thickness of the solidified shell inside the mold 1 can be estimated accurately. Furthermore, when the steel is to be cast continuously, by controlling the amount of the secondary cooling water immediately below the mold based on the estimated in-mold solidified shell thickness, it is possible to continuous-cast the steel productively, while suppressing the chances of occurrence of breakout, even when the in-mold solidified shell thickness is thin. The heat transfer model calculating unit 107 may also correct the errors in the mold copper plate temperature and in the amount of heat removed from the mold, by correcting only the overall heat transfer coefficient between the mold copper plate 11 and the solidified shell.

EXAMPLE

Example 1

Figure 10:
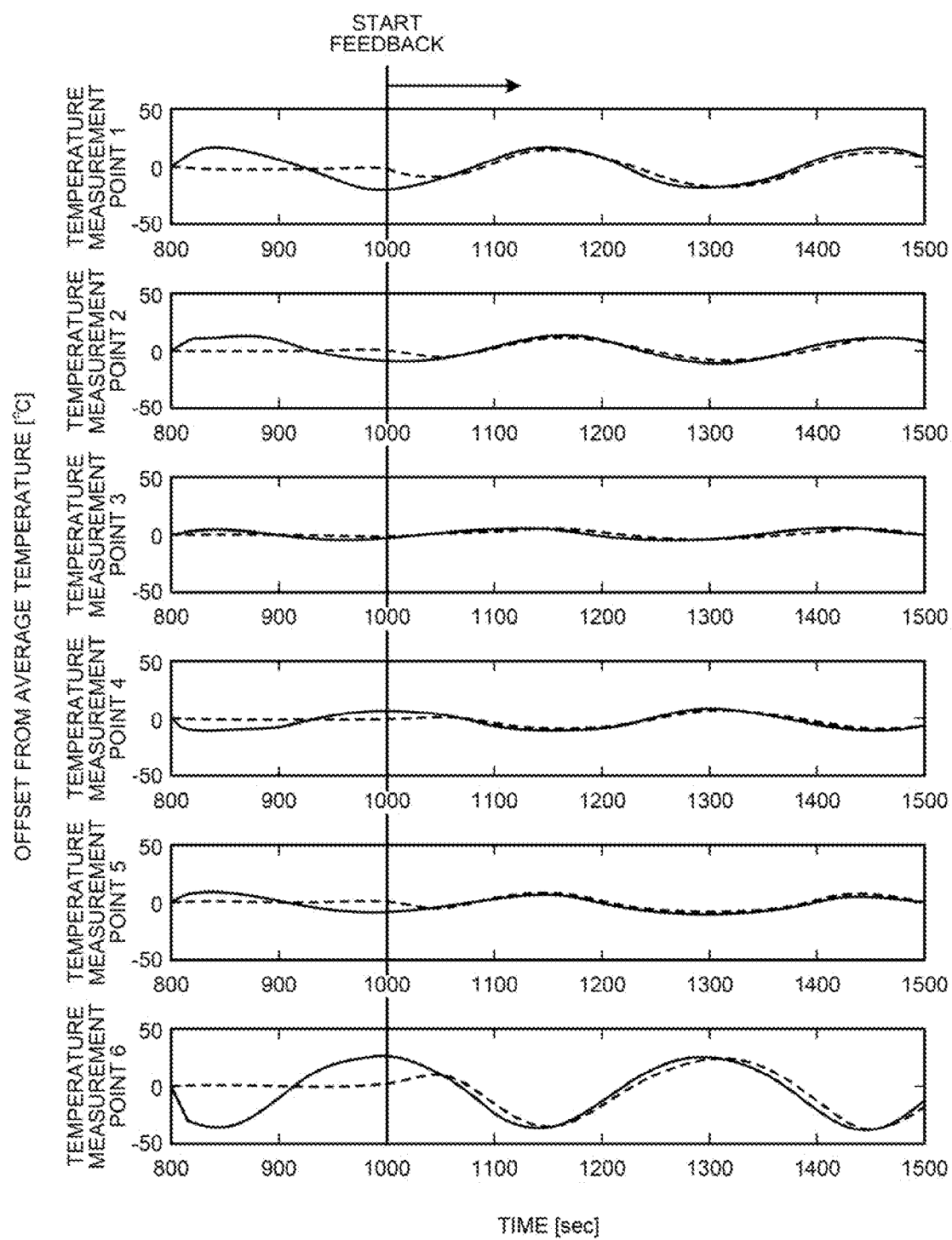
FIG. 10 is a schematic illustrating offsets of mold copper plate temperatures from their average at six points at a certain mold height in the width direction.
Figure 11:
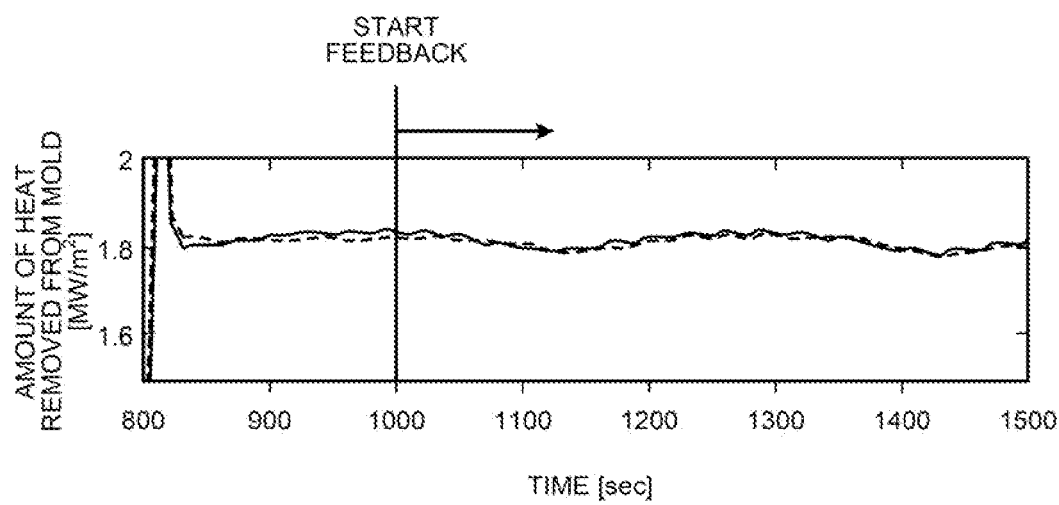
FIG. 11 is a schematic illustrating a temporal change in the amount of heat removed from the mold.
Figure 12:
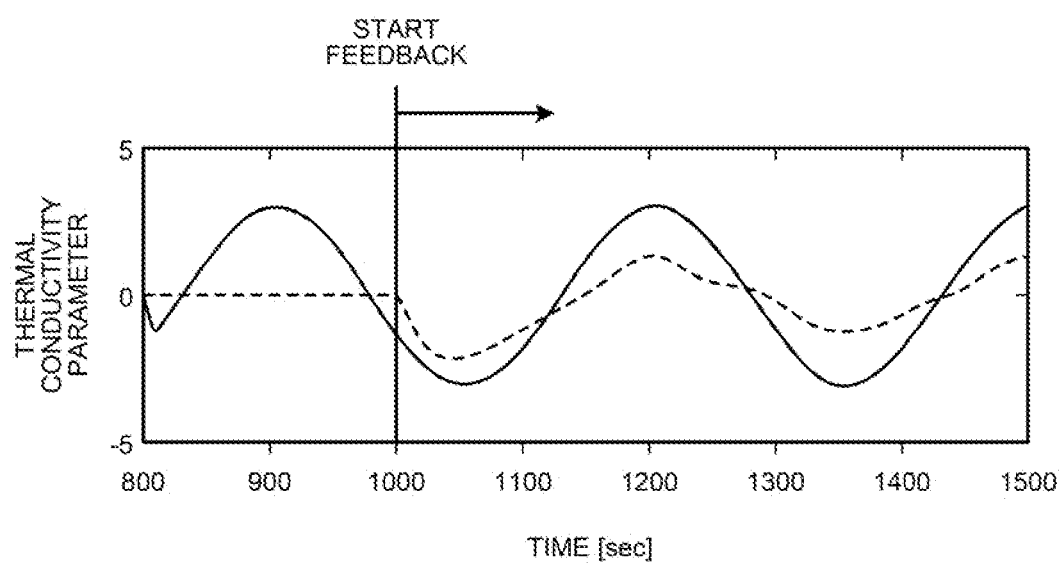
FIG. 12 is a schematic illustrating a temporal change in a thermal conductivity parameter.
Figure 13:
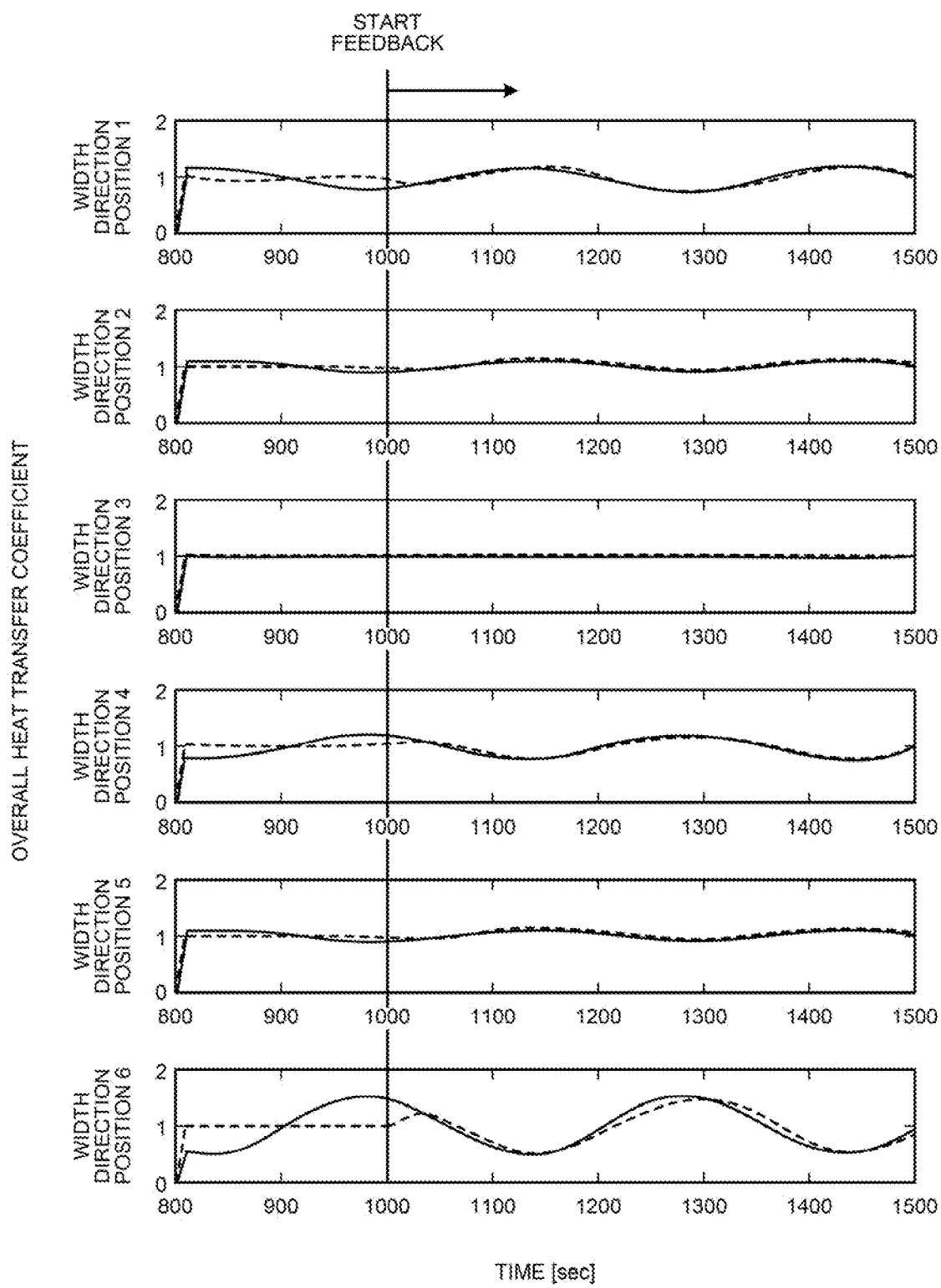
FIG. 13 is a schematic illustrating a temporal change in the overall heat transfer coefficient.
Figure 14:
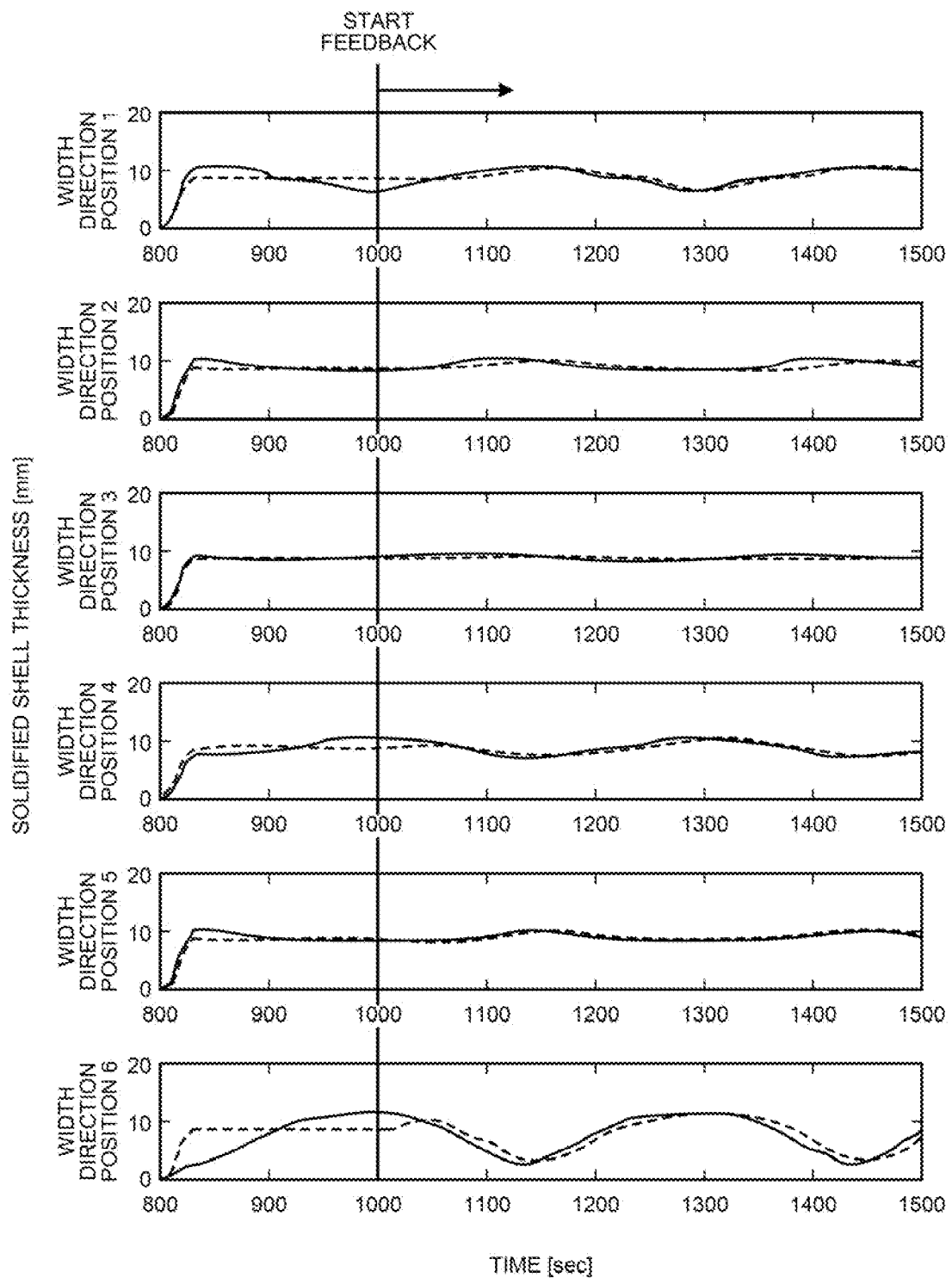
FIG. 14 is a schematic illustrating a distribution of the solidified shell thickness on the bottom end of the mold.

In this example, in the heat transfer model calculation, the errors in the temperature of the mold copper plate and the amount of heat removed from the mold were corrected by correcting the thermal conductivity parameter and the overall heat transfer coefficient. A virtual plant was created, with disturbances artificially introduced thereto by a simulation, and parameter estimations were carried out, to validate whether it is possible to estimate the thermal conductivity parameter corresponding to a change in the molten steel flow, and the overall heat transfer coefficient corresponding to a local change in the air gap, correctly in a separate manner. Presented now are some simulation results achieved by changing the thermal conductivity parameter for the front side of the mold in the long-side direction, in the shape of a sine wave. FIG. 10 illustrates offsets of mold copper plate temperatures from their average, at six points along a certain mold height position in the width direction, and FIG. 11 illustrates a temporal change in the amount of heat removed from the mold. The solid line represents the values of the virtual plant, and the dotted line represents values of the heat transfer model calculations. As illustrated in FIGS. 10 and 11, once the feedback was started, the difference between the value from the virtual plant and the heat transfer model calculation became smaller. In the parameter estimations carried out under this condition, the thermal conductivity parameter and the overall heat transfer coefficient were successfully estimated in a separate manner, as illustrated in FIGS. 12 and 13. Furthermore, FIG. 14 indicates solidified shell thickness distributions at six points in the width direction indicated in FIG. 13, on the bottom end of the mold. As illustrated in FIG. 14, it was confirmed that the in-mold solidified shell thicknesses in the virtual plant and the heat transfer model were successfully calibrated. FIGS. 12 to 14, the solid line represents values of the virtual plant, and the dotted line represents values of the heat transfer model calculation.

Example 2

Figure 15:
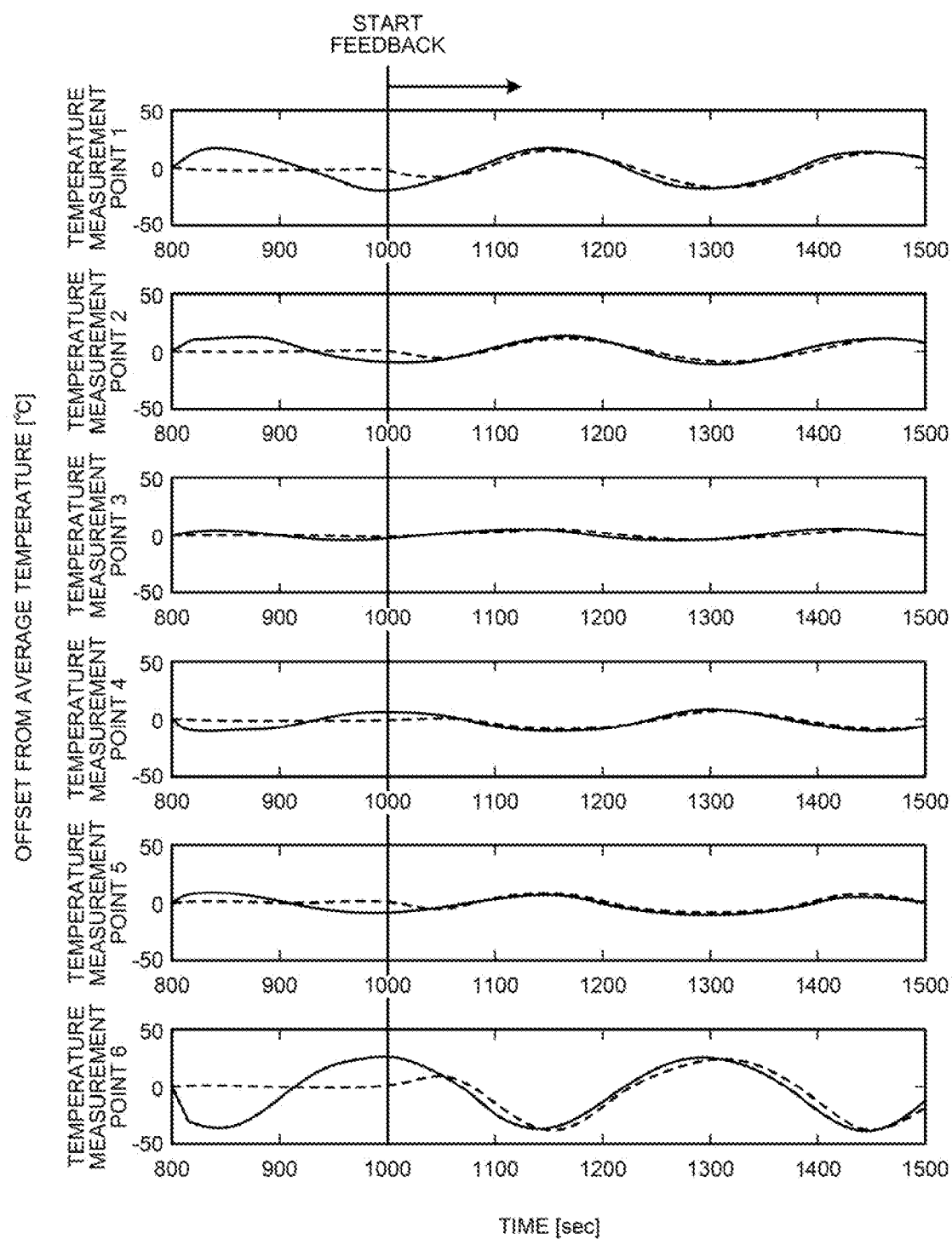
FIG. 15 is a schematic illustrating offsets from the mold copper plate temperatures from corresponding averages, at six points along a certain mold height position in the width direction.
Figure 16:
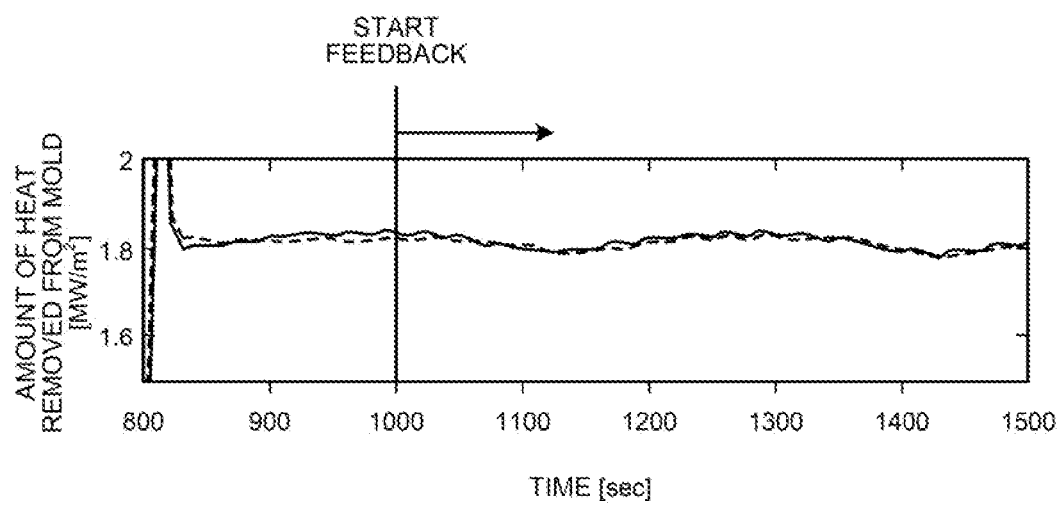
FIG. 16 is a schematic illustrating a temporal change in the amount of heat removed from the mold.
Figure 17:
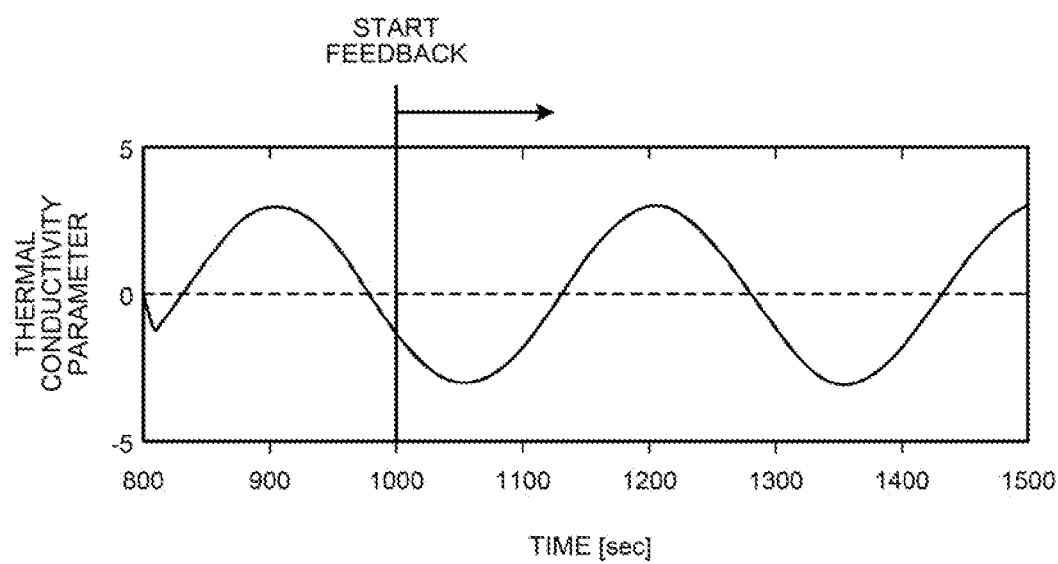
FIG. 17 is a schematic illustrating a temporal change in the thermal conductivity parameter.
Figure 18:
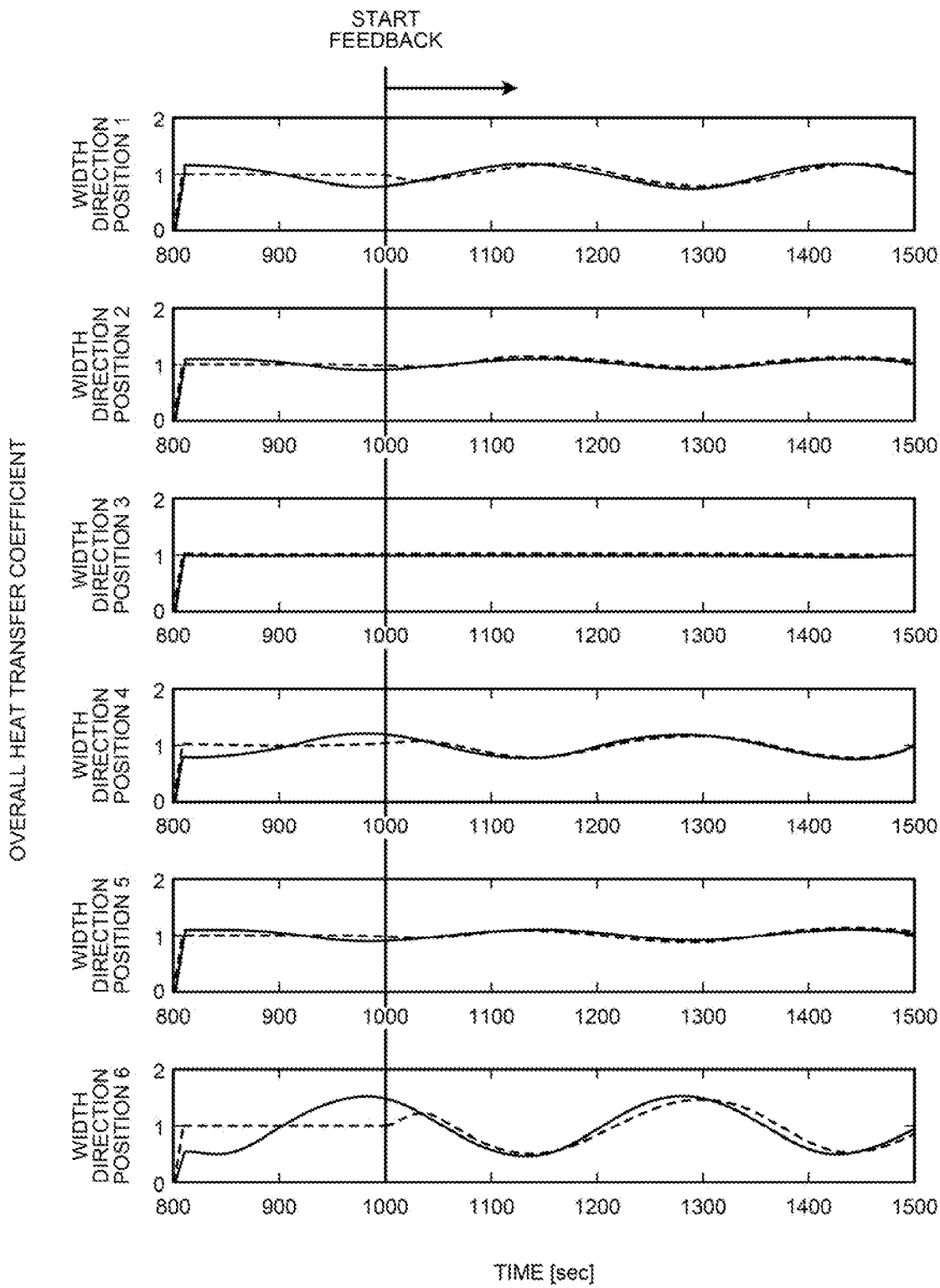
FIG. 18 is a schematic illustrating a temporal change in the overall heat transfer coefficient.
Figure 19:
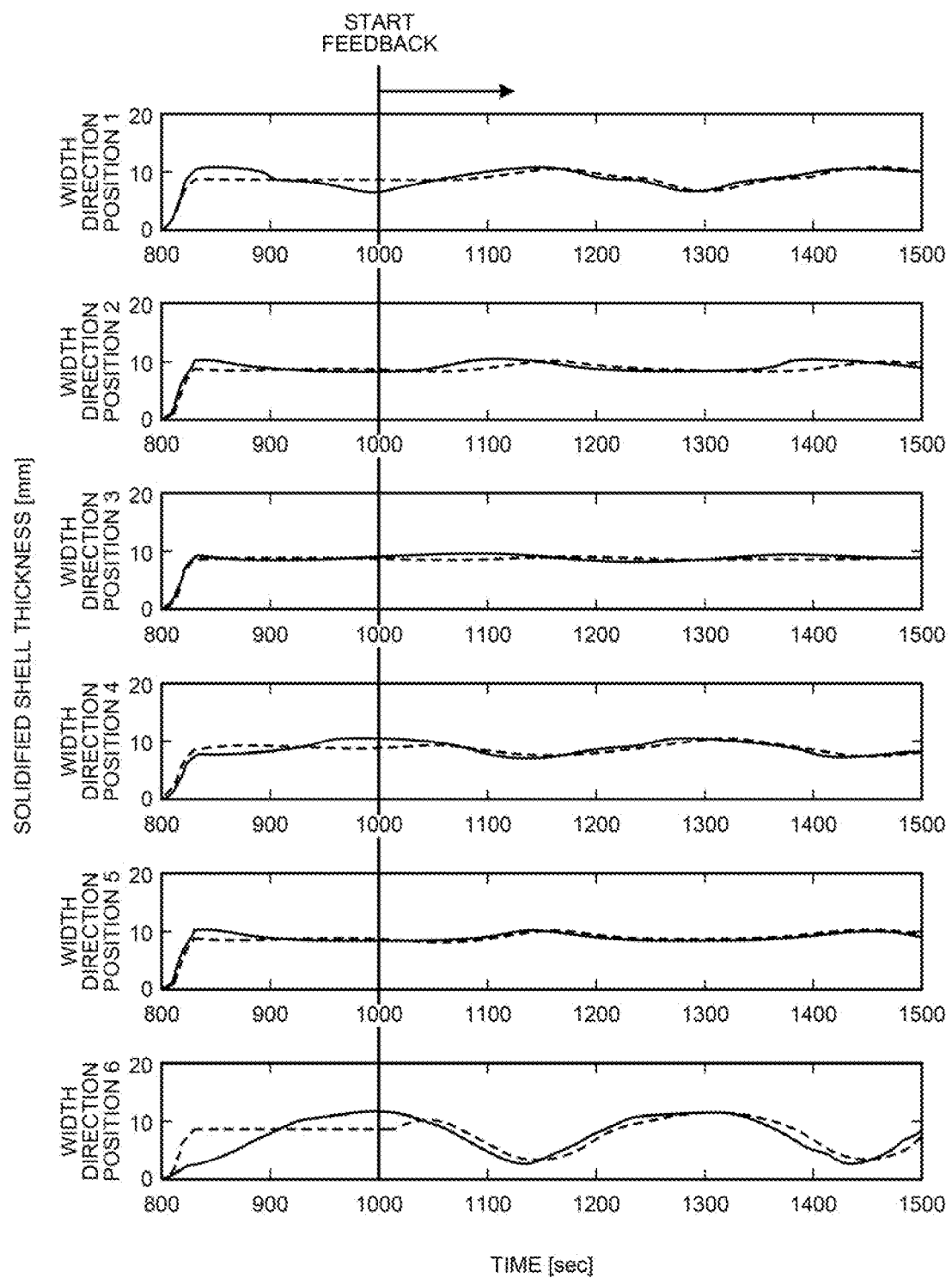
FIG. 19 is a schematic illustrating a distribution of the solidified shell thicknesses on the bottom end of the mold.

In this example, in the heat transfer model calculation, the errors in the temperatures of the mold copper plate and the amount of heat removed from the mold were corrected by correcting only the overall heat transfer coefficient. A virtual plant in which a disturbance is introduced artificially by simulation was created, and parameter estimations were carried out, to validate whether it is possible to estimate the overall heat transfer coefficient, which corresponds to a change in the local air gap, correctly in a separate manner. Presented now are some simulation results achieved by changing the thermal conductivity parameter for the front side of the mold in the long-side direction, in the shape of a sine wave. FIG. 15 illustrates offsets of the mold copper plate temperatures from their average, at six points along a certain mold height position in the width direction, and FIG. 16 illustrates a temporal change in the amount of heat removed from the mold. The solid line represents the values of the virtual plant, and the dotted line represents values of the heat transfer model calculation. As illustrated in FIGS. 15 and 16, once the feedback was started, the difference between the value from the virtual plant and the heat transfer model calculation became smaller. In the parameter estimation carried this time, although it was not possible to estimate the thermal conductivity parameter in a separate manner, as illustrated in FIG. 17, it was possible to estimate the overall heat transfer coefficient in a separate manner, as illustrated in FIG. 18. Furthermore, FIG. 19 indicates solidified shell thickness distributions at six points in the width direction indicated in FIG. 18, on the bottom end of the mold. As illustrated in FIG. 18, it was confirmed that the in-mold solidified shell thicknesses in the virtual plant and the heat transfer model calculation were successfully calibrated. In FIGS. 17 to 19, the solid line represents values of the virtual plant, and the dotted line represents values of the heat transfer model calculations.

Example 3

In this example, assuming comparative examples 1 to 3 are without the control of the amount of secondary cooling water, and the examples 1 to 3 are with the control of the amount of secondary cooling water on the downstream side of the position immediately below the mold, Table 2 below presents estimations of the ratio $\Delta d/d_{ave}$ inside the mold, the estimations having been made based on the in-mold solidified shell thickness estimated using the method described above, and the ratios $\Delta d/d_{ave}$ at positions where the ratio $d/D$ was 0.25, the ratio $d/D$ having been obtained by solving the thermal conduction equation of the secondary cooling zone using the solidified shell thickness of the outgoing side of the mold as a reference. As indicated in Table 2, an increase in the ratio $\Delta d/d_{ave}$ was suppressed in the examples 1 to 3, compared with that in the comparative examples 1 to 3. With these results, it was confirmed that, by controlling the amount of secondary cooling water on the downstream side of the position immediately below the mold, it was possible to increase the thickness of the in-mold solidified shell in the part where the in-mold solidified shell is thin, and to reduce the risk of breakout.

TABLE 2

| | With/Without Secondary Cooling Control | Estimation of $\Delta d/d_{ave}$ Inside Mold | $\Delta d/d_{ave}$ with $d/D = 0.25$ |
|---|---|---|---|
| Comparative Example 1 | Without Control | 0.12 | 0.21 |
| Comparative Example 2 | Without Control | 0.15 | 0.25 |
| Comparative Example 3 | Without Control | 0.17 | 0.28 |

TABLE 2-continued

| | With/Without Secondary Cooling Control | Estimation of $\Delta d/d_{ave}$ Inside Mold | $\Delta d/d_{ave}$ with d/D = 0.25 |
|---|---|---|---|
| Example 1 | With Control | 0.12 | 0.13 |
| Example 2 | With Control | 0.15 | 0.16 |
| Example 3 | With Control | 0.17 | 0.18 |

Some embodiments of applications of the invention made by the present inventors have been explained above, but the descriptions and drawings making up a part of the disclosure of the present invention by means of the embodiments are not intended to limit the scope of the present invention in any way. For example, a relation between the flow rate of the molten steel and the thermal conductivity of the semi-solidified region in the heat transfer calculation model has been clarified; however, if a flow rate distribution of the molten steel can be clarified, it will be possible to improve the accuracy of the solidified shell thickness estimation performed by the heat transfer calculation model alone, by introducing a conversion equation between the flow rate of the molten steel and the thermal conductivity of the semi-solidified region. By then carrying out a principal component analysis to the difference between the actual measurements and the mold copper plate temperature calculations output from the heat transfer calculation model with improved accuracy, it can be expected that the effect of unknown disturbances other than the molten steel flow and the air gap can be included in the heat transfer calculation model. In this manner, other embodiments, examples, and operation technologies and the like implemented by those skilled in the art based on the embodiment all fall within the scope of the present invention.

INDUSTRIAL APPLICABILITY

According to the present invention, it is possible to provide an in-mold solidified shell thickness estimation apparatus and an in-mold solidified shell thickness estimation method capable of estimating the in-mold solidified shell thickness highly accurately. Furthermore, according to the present invention, it is possible to provide a continuous steel casting method capable of casting steel highly productively.

REFERENCE SIGNS LIST 1 mold
3 submerged entry nozzle
5 molten steel
7 mold powder
9 solidified shell
11 mold copper plate
100 in-mold solidified shell thickness estimation apparatus
101 control terminal
102 input device
103 model database (model DB)
104 arithmetic processing unit
107 heat transfer model calculating unit
108 output device
110 display device
201 cooling water
202 semi-solidified region
203 flow rate of molten steel
204 amount of heat removed from mold

The invention claimed is:

1. An in-mold solidified shell thickness estimation apparatus comprising:
an input device configured to receive an input of:
a measurement result of a temperature of molten steel in a tundish of a continuous casting facility;
measurement results of a width of a strand being cast and of a casting speed in the continuous casting facility;
measurement results of a temperature of a mold copper plate and of an amount of heat removed from a mold in the continuous casting facility; and
input values of a chemical composition of the molten steel and of the thickness of the strand;
a model database configured to store a model formula and a parameter related to a solidification reaction of the molten steel inside the mold of the continuous casting facility; and
a heat transfer model calculator configured to estimate an in-mold solidified shell thickness by calculating temperature distributions of the mold and of the molten steel inside the mold by solving a three-dimensional unsteady heat transfer equation using the measurement result of the temperature of the molten steel in the tundish of the continuous casting facility, the measurement results of the width of the strand being cast and of the casting speed in the continuous casting facility, the measurement results of the temperature of the mold copper plate and of the amount of heat removed from the mold in the continuous casting facility, and the input values of the chemical composition of the molten steel and of the thickness of the strand, and the model formula and the parameter, wherein
the heat transfer model calculator is configured to correct errors in the temperature of the mold copper plate and in the amount of heat removed from the mold, by correcting an overall heat transfer coefficient between the mold copper plate and the solidified shell.

2. The in-mold solidified shell thickness estimation apparatus according to claim 1, wherein the heat transfer model calculator is configured to correct the errors in the mold copper plate temperature and in the amount of heat removed from the mold, by correcting a thermal conductivity of a region having a temperature higher than a solidus temperature and lower than a liquidus temperature of the molten steel, in addition to correcting the overall heat transfer coefficient.

3. The in-mold solidified shell thickness estimation apparatus according to claim 2, wherein the heat transfer model calculator is configured to
calculate an amount of solidification shrinkage of the molten steel, from the temperature distribution of the molten steel inside the mold, and
calculate the overall heat transfer coefficient between the mold and the solidified shell based on the amount of solidification shrinkage.

4. The in-mold solidified shell thickness estimation apparatus according to claim 3, wherein the input values of the chemical composition of the molten steel and the strand thickness are measurement results of the chemical composition of the molten steel and the strand thickness.

5. The in-mold solidified shell thickness estimation apparatus according to claim 2, wherein the input values of the chemical composition of the molten steel and the strand thickness are measurement results of the chemical composition of the molten steel and the strand thickness.

6. The in-mold solidified shell thickness estimation apparatus according to claim 1, wherein the heat transfer model calculator is configured to
calculate an amount of solidification shrinkage of the molten steel, from the temperature distribution of the molten steel inside the mold, and
calculate the overall heat transfer coefficient between the mold and the solidified shell based on the amount of solidification shrinkage.

7. The in-mold solidified shell thickness estimation apparatus according to claim 6, wherein the input values of the chemical composition of the molten steel and the strand thickness are measurement results of the chemical composition of the molten steel and the strand thickness.

8. The in-mold solidified shell thickness estimation apparatus according to claim 1, wherein the input values of the chemical composition of the molten steel and the strand thickness are measurement results of the chemical composition of the molten steel and the strand thickness.

9. An in-mold solidified shell thickness estimation method comprising:
an input step of inputting:
a measurement result of a temperature of molten steel in a tundish of a continuous casting facility;
measurement results of a width of a strand being cast and of a casting speed in the continuous casting facility;
measurement results of a temperature of a mold copper plate and of an amount of heat removed from a mold in the continuous casting facility; and
input values of a chemical composition of the molten steel and of the thickness of the strand;
a heat transfer model calculating step of estimating an in-mold solidified shell thickness by calculating temperature distributions of the mold and of the molten steel inside the mold by solving a three-dimensional unsteady heat transfer equation using the measurement result of the temperature of the molten steel in the tundish of the continuous casting facility, the measurement results of the width of the strand being cast and of the casting speed in the continuous casting facility, the measurement results of the temperature of the mold copper plate and of the amount of heat removed from the mold in the continuous casting facility, and the input values of the chemical composition of the molten steel and of the thickness of the strand, and a model formula and a parameter related to a solidification reaction of the molten steel inside the mold of the continuous casting facility, wherein
the heat transfer model calculating step includes a step of correcting errors in the mold copper plate temperature and in the amount of heat removed from the mold, by correcting an overall heat transfer coefficient between the mold copper plate and the solidified shell.

10. The in-mold solidified shell thickness estimation method according to claim 9, wherein
the heat transfer model calculating step includes a step of correcting the errors in the mold copper plate temperature and the amount of heat removed from the mold by correcting a thermal conductivity of a region having a temperature higher than a solidus temperature and lower than a liquidus temperature of the molten steel, in addition to correcting the overall heat transfer coefficient.

11. The in-mold solidified shell thickness estimation method according to claim 10, wherein the heat transfer model calculating step includes a step of:
calculating an amount of solidification shrinkage of the molten steel, from the temperature distribution of the molten steel inside the mold, and
calculating the overall heat transfer coefficient between the mold and the solidified shell based on the amount of solidification shrinkage.

12. The in-mold solidified shell thickness estimation method according to claim 11, wherein the input values of the chemical composition of the molten steel and the strand thickness are measurement results of the chemical composition of the molten steel and the strand thickness.

13. The in-mold solidified shell thickness estimation method according to claim 10, wherein the input values of the chemical composition of the molten steel and the strand thickness are measurement results of the chemical composition of the molten steel and the strand thickness.

14. The in-mold solidified shell thickness estimation method according to claim 9, wherein the heat transfer model calculating step includes a step of:
calculating an amount of solidification shrinkage of the molten steel, from the temperature distribution of the molten steel inside the mold, and
calculating the overall heat transfer coefficient between the mold and the solidified shell based on the amount of solidification shrinkage.

15. The in-mold solidified shell thickness estimation method according to claim 14, wherein the input values of the chemical composition of the molten steel and the strand thickness are measurement results of the chemical composition of the molten steel and the strand thickness.

16. The in-mold solidified shell thickness estimation method according to claim 9, wherein the input values of the chemical composition of the molten steel and the strand thickness are measurement results of the chemical composition of the molten steel and the strand thickness.

17. A continuous steel casting method comprising
a control step of controlling an amount of secondary cooling water based on an in-mold solidified shell thickness estimated by the in-mold solidified shell thickness estimation method according to claim 9.

18. The continuous steel casting method according to claim 17, wherein the control step includes a step of determining an abnormality of an in-mold solidified shell thickness by comparing a difference between a maximum value and a minimum value of in-mold solidified shell thicknesses inside the mold, the in-mold solidified shell thicknesses being those within a predetermined given range, with an average of the in-mold solidified shell thicknesses within the predetermined given range, and of controlling the amount of secondary cooling water, when it is determined that there is an abnormality in the in-mold solidified shell thickness, in such a manner that the in-mold solidified shell thickness becomes equal to or more than a thickness corresponding to a given ratio of the strand thickness, when a strand portion reaches a secondary cooling zone that is immediately below the mold.

* * * * *